US012596092B2

(12) United States Patent
Watanabe

(10) Patent No.: US 12,596,092 B2
(45) Date of Patent: Apr. 7, 2026

(54) GAS SENSOR AND CONTROL METHOD OF GAS SENSOR

(71) Applicant: NGK INSULATORS, LTD., Nagoya (JP)

(72) Inventor: Yusuke Watanabe, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 548 days.

(21) Appl. No.: 18/085,642

(22) Filed: Dec. 21, 2022

(65) Prior Publication Data

US 2023/0204534 A1    Jun. 29, 2023

(30) Foreign Application Priority Data

Dec. 27, 2021    (JP) ................................. 2021-212081

(51) Int. Cl.
*G01N 27/407* (2006.01)
*G01N 27/30* (2006.01)
(Continued)

(52) U.S. Cl.
CPC ....... *G01N 27/4071* (2013.01); *G01N 27/301* (2013.01); *G01N 27/4067* (2013.01);
(Continued)

(58) Field of Classification Search
CPC ............. G01N 27/4071; G01N 27/301; G01N 27/4067; G01N 27/4072; G01N 27/4074; G01N 27/409; G01N 27/419
See application file for complete search history.

(56) References Cited

U.S. PATENT DOCUMENTS 5,763,763 A      6/1998  Kato et al.
2004/0050696 A1*  3/2004  Inoue ................... G01N 27/419
204/431
(Continued)

FOREIGN PATENT DOCUMENTS

JP          9-113484 A      5/1997
JP        2001-141696      *  5/2001   ........... G01N 27/416
(Continued)

OTHER PUBLICATIONS

EPO translation Hiroo et al. JP 2001-141696, patent published May 25, 2001 (Year: 2001).*
(Continued)

*Primary Examiner* — Alexander S Noguerola
(74) *Attorney, Agent, or Firm* — MATTINGLY & MALUR, PC

(57) ABSTRACT

A gas sensor includes a sensor element including an adjustment pump cell and a measurement pump cell, and a control unit including a pump control part. The pump control part performs a startup pump control at a startup of the sensor element, and a steady driving pump control at a steady drive after the startup. In the startup pump control, the pump control part applies, between an inner pump electrode and an outer pump electrode of the adjustment pump cell, a startup voltage of the adjustment pump cell that is higher than a voltage applied in the steady driving pump control; and applies, between an inner measurement electrode and an outer measurement electrode of the measurement pump cell, a startup voltage of the measurement pump cell that is higher than a voltage applied in the steady driving pump control and lower than the startup voltage of the adjustment pump cell.

8 Claims, 4 Drawing Sheets

(51) Int. Cl.

| | |
|---|---|
| *G01N 27/406* | (2006.01) |
| *G01N 27/409* | (2006.01) |
| *G01N 27/419* | (2006.01) |

(52) U.S. Cl.
CPC ..... *G01N 27/4072* (2013.01); *G01N 27/4074* (2013.01); *G01N 27/409* (2013.01); *G01N 27/419* (2013.01)

(56) References Cited

U.S. PATENT DOCUMENTS

| | | | |
|---|---|---|---|
| 2011/0132775 A1 | 6/2011 | Kawai et al. | |
| 2020/0003723 A1* | 1/2020 | Kamada | F02D 41/2435 |
| 2020/0003726 A1* | 1/2020 | Nakagaki | G01M 15/102 |
| 2020/0256270 A1* | 8/2020 | Takeuchi | G01N 27/4065 |
| 2021/0302400 A1 | 9/2021 | Watanabe et al. | |

FOREIGN PATENT DOCUMENTS

| | | | |
|---|---|---|---|
| JP | 2001-281211 A | | 10/2001 |
| JP | 4903895 B2 | | 3/2012 |
| JP | 2021-156595 A | | 10/2021 |

OTHER PUBLICATIONS

EPO machine-generated English language translation of JP 2001 141696 A, patent published May 25, 2001 (Year: 2001).*

EPO machine-generated English language translation of JP 2001 281211 A, patent published Oct. 10, 2001 (Year: 2001).*

EPO machine-generated English language translation of JP 2021 156595 A, patent published Oct. 7, 2021 (Year: 2021).*

J-PlatPat machine-generated English language translation of JP H09-113484 A, patent published May 2, 1997 (Year: 1997).*

German Office Action received in corresponding German Application No. 10 2022 134 077.5 dated Jul. 17, 2025.

* cited by examiner

GAS SENSOR AND CONTROL METHOD OF GAS SENSOR

CROSS-REFERENCE TO RELATED APPLICATION

The present application claims priority from Japanese application JP2021-212081, filed on Dec. 27, 2021, the contents of which is hereby incorporated by reference into this application.

BACKGROUND OF THE INVENTION

Technical Field of the Invention

The present invention relates to a gas sensor and a control method of the gas sensor.

Background Art

A gas sensor is used for detection or measurement of concentration of an objective gas component (oxygen $O_2$, nitrogen oxide NOx, ammonia $NH_3$, hydrocarbon HC, carbon dioxide $CO_2$, etc.) in a measurement-object gas, such as exhaust gas of automobile. For example, conventionally, the concentration of the objective gas component in exhaust gas of an automobile is measured, and an exhaust gas cleaning system mounted on the automobile is optimally controlled based on the measurement.

As such a gas sensor, a gas sensor using an oxygen ion conductive solid electrolyte such as zirconia ($ZrO_2$) is known. For example, JP 4903895 B2 discloses a gas sensor that includes a first oxygen pump cell adjusting an oxygen concentration of the object gas introduced into a first measurement chamber, and a second oxygen pump cell detecting a concentration of a specific gas introduced into a second measurement chamber.

JP 4903895 B2 also discloses that preliminary control that includes supplying a constant current to the second oxygen pump cell over a constant time is performed before the start of drive control to reduce variation in the startup time of the gas sensor.

CITATION LIST

Patent Document

Patent Document 1: JP 4903895 B2

SUMMARY OF THE INVENTION

Problems to be Solved by the Invention

A gas sensor using a solid electrolyte requires time to start measurement of the concentration of a target gas to be measured after its activation. This time is called light-off time.

Due to the tightening of automobile emission control regulations and the like, automobiles are required to make their exhaust gas purification systems function in a shorter time after engine starting. For this purpose, the gas sensor is required to have a shorter light-off time.

For example, as described above, JP 4903895 B2 discloses that in a gas sensor including a first oxygen pump cell and a second oxygen pump cell, preliminary control that includes supplying a constant current to the second oxygen pump cell over a constant time is performed before the start of drive control to reduce variation in the startup time (light-off time) of the gas sensor. It is disclosed that a voltage applied to the second oxygen pump cell in the preliminary control is higher than that in the drive control.

However, it has been found that such a gas sensor having two or more pump cells serially disposed from the inlet of a measurement-object gas may have a long light-off time as will be described later in detail.

Further, it has been found that when an excessively high voltage is applied to the pump cell, the strength of a solid electrolyte included in the pump cell may reduce due to the migration of oxygen constituting the solid electrolyte. It has also been found that as a result of that, cracking may occur in the internal structure of a sensor element.

It is therefore an object of the present invention to provide a gas sensor that has a short light-off time and suppresses the occurrence of cracking in the internal structure of a sensor element.

Means for Solving the Problems

As a result of intensive studies, the present inventor has found that, by the following invention, it is possible to prevent the occurrence of cracking in the internal structure of a sensor element, and to shorten a light-off time.

The present invention includes the following aspects.

(1) A gas sensor for detecting a target gas to be measured in a measurement-object gas, the gas sensor comprising a sensor element and a control unit for controlling the sensor element, wherein the sensor element comprises:

a base part in an elongated plate shape, including an oxygen-ion-conductive solid electrolyte layer;

a measurement-object gas flow part formed from one end part in a longitudinal direction of the base part;

an adjustment pump cell for adjusting an oxygen concentration in a measurement-object gas to a desired concentration, the adjustment pump cell including: an inner pump electrode disposed on an inner surface of the measurement-object gas flow part; and an outer pump electrode disposed at a position different from the measurement-object gas flow part on the base part and corresponding to the inner pump electrode; and a measurement pump cell for detecting a target gas to be measured in the measurement-object gas, the measurement pump cell including: an inner measurement electrode disposed at a position farther from the one end part in the longitudinal direction of the base part than the inner pump electrode on the inner surface of the measurement-object gas flow part; and an outer measurement electrode disposed at a position different from the measurement-object gas flow part on the base part and corresponding to the inner measurement electrode, and the control unit comprises:

a pump control part for controlling operation of the adjustment pump cell and the measurement pump cell, wherein the pump control part performs a startup pump control at a startup of the sensor element, and a steady driving pump control at a steady drive of the sensor element after the startup, in the startup pump control, the pump control part applies, between the inner pump electrode and the outer pump electrode of the adjustment pump cell, a startup voltage of the adjustment pump cell that is higher than a voltage applied to the adjustment pump cell in the steady driving pump control; and applies, between the inner measurement electrode and the outer measurement electrode of the measurement pump cell, a startup voltage of the measurement pump cell that is higher than a voltage applied to the measurement pump cell in the steady driving pump control and lower than the startup voltage of the adjustment pump cell, and in the steady driving pump control, the pump control part adjusts an oxygen concentration in a measurement-object gas to a desired concentration by the adjustment pump cell; and detects a target gas to be measured in the measurement-object gas by the measurement pump cell.

(2) The gas sensor according to the above (1), wherein the sensor element further comprises:

an auxiliary pump cell for further adjusting the oxygen concentration in the measurement-object gas, the auxiliary pump cell including: an inner auxiliary pump electrode disposed at a position farther from the one end part in the longitudinal direction of the base part than the inner pump electrode on the inner surface of the measurement-object gas flow part; and an outer auxiliary pump electrode disposed at a position different from the measurement-object gas flow part on the base part and corresponding to the inner auxiliary pump electrode, in the startup pump control, the pump control part further applies, between the inner auxiliary pump electrode and the outer auxiliary pump electrode of the auxiliary pump cell, a startup voltage of the auxiliary pump cell that is higher than a voltage applied to the auxiliary pump cell in the steady driving pump control, equal to or lower than the startup voltage of the adjustment pump cell, and higher than the startup voltage of the measurement pump cell, and in the steady driving pump control, the pump control part adjusts the oxygen concentration in the measurement-object gas to the desired concentration by the adjustment pump cell; further adjusts, by auxiliary pump cell, the oxygen concentration in the measurement-object gas that has been adjusted by the adjustment pump cell; and detects the target gas to be measured in the measurement-object gas by the measurement pump cell.

(3) The gas sensor according to the above (1) or (2), wherein the sensor element comprises a heater for heating the base part, and the control unit comprises:

a heater control part for controlling the heater; and further a determining part for determining a start and an end of the startup pump control, wherein the heater control part performs a heater control that includes heating the base part by the heater to raise a temperature of the base part through a starting temperature of the startup pump control further up to a predetermined steady driving temperature, and maintaining the temperature of the base part at the steady driving temperature; and the determining part makes the pump control part start the startup pump control, when the determining part determines that the temperature of the base part reaches the starting temperature of the startup pump control.

(4) The gas sensor according to the above (3), wherein the determining part makes the pump control part switch from the startup pump control to the steady driving pump control, when the determining part determines that a pump current flowing through the measurement pump cell is equal to or less than a predetermined threshold value in the startup pump control.

(5) The gas sensor according to the above (3), wherein the sensor element comprises a reference electrode disposed inside the base part to be in contact with a reference gas, and the determining part makes the pump control part switch from the startup pump control to the steady driving pump control, when the determining part determines that an electromotive force between the inner measurement electrode and the reference electrode is equal to or more than a predetermined threshold value in the startup pump control.

(6) The gas sensor according to any one of the above (1) to (5), wherein the startup voltage of the adjustment pump cell is 1.5 V or more and 3.0 V or less.

(7) The gas sensor according to any one of the above (1) to (6), wherein the startup voltage of the measurement pump cell is 0.5 V or more and 1.45 V or less.

(8) The gas sensor according to any one of the above (1) to (7), wherein a voltage ratio of the startup voltage of the adjustment pump cell to the startup voltage of the measurement pump cell is 1.03 or more and 6.00 or less.

(9) A control method of a gas sensor for detecting a target gas to be measured in a measurement-object gas, the gas sensor comprising a sensor element and a control unit for controlling the sensor element, wherein the sensor element comprises:

a base part in an elongated plate shape, including an oxygen-ion-conductive solid electrolyte layer;

a measurement-object gas flow part formed from one end part in a longitudinal direction of the base part;

an adjustment pump cell for adjusting an oxygen concentration in a measurement-object gas to a desired concentration, the adjustment pump cell including: an inner pump electrode disposed on an inner surface of the measurement-object gas flow part; and an outer pump electrode disposed at a position different from the measurement-object gas flow part on the base part and corresponding to the inner pump electrode; and a measurement pump cell for detecting a target gas to be measured in the measurement-object gas, the measurement pump cell including: an inner measurement electrode disposed at a position farther from the one end part in the longitudinal direction of the base part than the inner pump electrode on the inner surface of the measurement-object gas flow part; and an outer measurement electrode disposed at a position different from the measurement-object gas flow part on the base part and corresponding to the inner measurement electrode, and the control unit comprises:

a pump control part for controlling operation of the adjustment pump cell and the measurement pump cell, and the control method comprising:

a startup pump control step performed at a startup of the sensor element, and a steady driving pump control step performed thereafter, wherein, in the startup pump control step, the pump control part applies, between the inner pump electrode and the outer pump electrode of the adjustment pump cell, a startup voltage of the adjustment pump cell that is higher than a voltage applied to the adjustment pump cell in the steady driving pump control; and applies, between the inner measurement electrode and the outer measurement electrode of the measurement pump cell, a startup voltage of the measurement pump cell that is higher than a voltage applied to the measurement pump cell in the steady driving pump control and lower than the startup voltage of the adjustment pump cell, and in the steady driving pump control step, the pump control part adjusts an oxygen concentration in a measurement-object gas to a desired concentration by the adjustment pump cell, and detects a target gas to be measured in the measurement-object gas by the measurement pump cell.

(10) The control method according to the above (9), wherein the sensor element further comprises:

an auxiliary pump cell for further adjusting the oxygen concentration in the measurement-object gas, the auxiliary pump cell including: an inner auxiliary pump electrode disposed at a position farther from the one end part in the longitudinal direction of the base part than the inner pump electrode on the inner surface of the measurement-object gas flow part; and an outer auxiliary pump electrode disposed at a position different from the measurement-object gas flow part on the base part and corresponding to the inner auxiliary pump electrode, in the startup pump control step, the pump control part further applies, between the inner auxiliary pump electrode and the outer auxiliary pump electrode of the auxiliary pump cell, a startup voltage of the auxiliary pump cell that is higher than a voltage applied to the auxiliary pump cell in the steady driving pump control, equal to or lower than the startup voltage of the adjustment pump cell, and higher than the startup voltage of the measurement pump cell, and in the steady driving pump control step, the pump control part adjusts the oxygen concentration in the measurement-object gas to a desired concentration by the adjustment pump cell; further adjusts, by auxiliary pump cell, the oxygen concentration in the measurement-object gas that has been adjusted by the adjustment pump cell; and detects the target gas to be measured in the measurement-object gas by the measurement pump cell.

(11) The control method according to the above (9) or (10), wherein the sensor element comprises a heater for heating the base part, the control unit comprises:

a heater control part for controlling the heater; and further a determining part for determining a start and an end of the startup pump control, and while the heater control part performs a heater control step of heating the base part by the heater to raise a temperature of the base part through a starting temperature of the startup pump control further up to a predetermined steady driving temperature, and maintaining the temperature of the base part at the steady driving temperature, the determining part starts the startup pump control step when the determining part determines that the temperature of the base part reaches the starting temperature of the startup pump control.

(12) The control method according to the above (11), wherein, while the heater control part performs the heater control step, the determining part ends the startup pump control step and starts the steady driving pump control step when the determining part determines that a pump current flowing through the measurement pump cell is equal to or less than a predetermined threshold value in the startup pump control.

(13) The control method according to the above (11), wherein the sensor element comprises a reference electrode disposed inside the base part to be in contact with a reference gas, and while the heater control part performs the heater control step, the determining part ends the startup pump control step and starts the steady driving pump control step when the determining part determines that an electromotive force between the inner measurement electrode and the reference electrode is equal to or more than a predetermined threshold value in the startup pump control.

(14) The control method according to any one of the above (9) to (13), wherein the startup voltage of the adjustment pump cell is 1.5 V or more and 3.0 V or less.

(15) The control method according to any one of the above (9) to (14), wherein the startup voltage of the measurement pump cell is 0.5 V or more and 1.45 V or less.

(16) The control method according to any one of the above (9) to (15), wherein a voltage ratio of the startup voltage of the adjustment pump cell to the startup voltage of the measurement pump cell is 1.03 or more and 6.00 or less.

Advantageous Effect of the Invention

According to the present invention, it is possible to provide a gas sensor that has a short light-off time and suppresses the occurrence of cracking in the internal structure of a sensor element.

BRIEF DESCRIPTION OF THE DRAWINGS

FIG. 1 is a vertical sectional schematic view in a longitudinal direction, showing one example of a general configuration of a gas sensor 100.

FIG. 2 is a block diagram showing electric connections between a control unit 90 and respective pump cells 21, 50, and 41, respective sensor cells 80, 81, 82, and 83, and heater part 70 of a sensor element 101.

MODES FOR CARRYING OUT OF THE INVENTION

Figure 3:
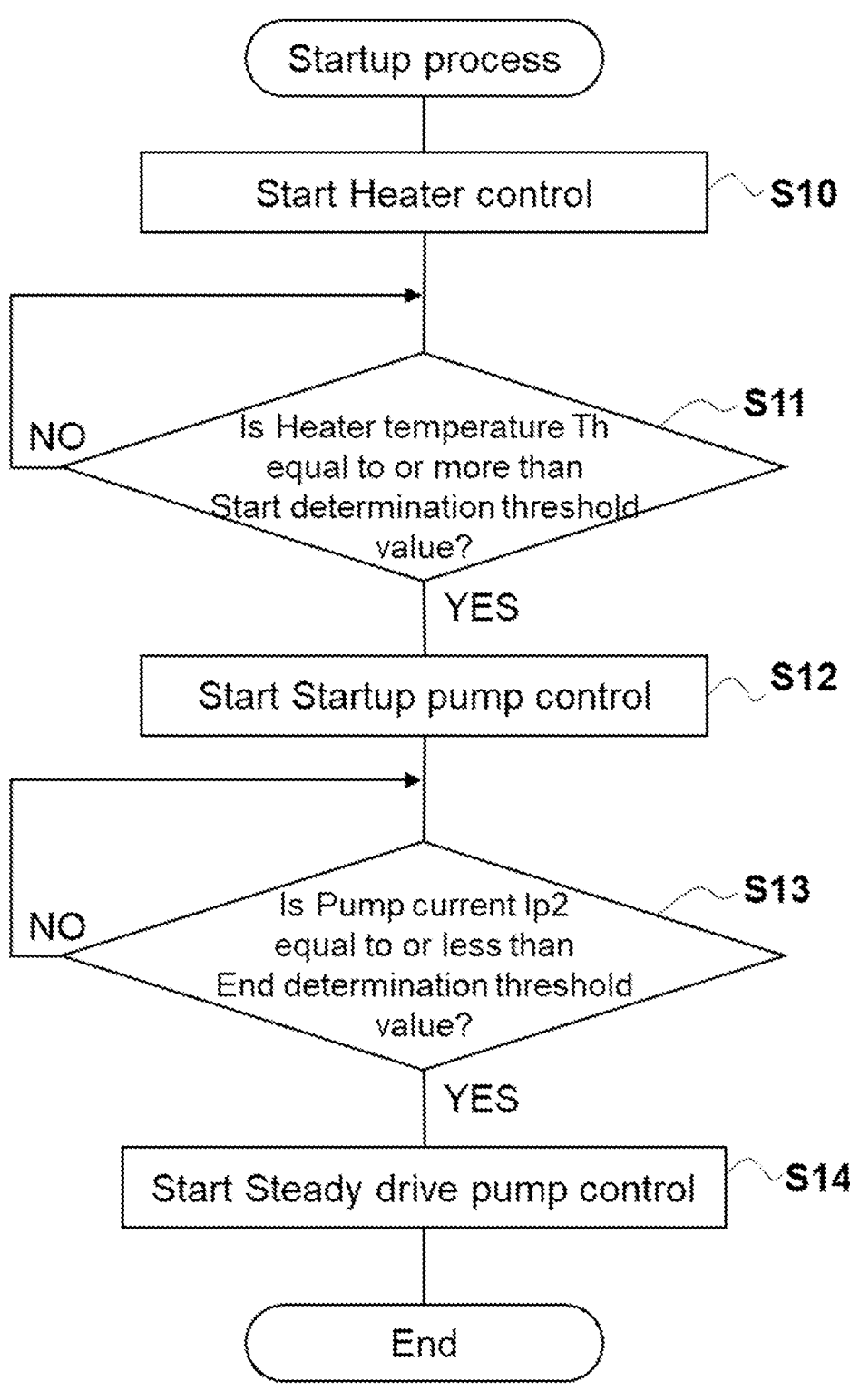
FIG. 3 is a flow chart showing an example of a startup process of the gas sensor 100.

A gas sensor of the present invention includes a sensor element and a control unit for controlling the sensor element.

The sensor element contained in the gas sensor of the present invention includes:

a base part in an elongated plate shape, including an oxygen-ion-conductive solid electrolyte layer;

a measurement-object gas flow part formed from one end part in a longitudinal direction of the base part;

an adjustment pump cell for adjusting an oxygen concentration in a measurement-object gas to a desired concentration, the adjustment pump cell including: an inner pump electrode disposed on an inner surface of the measurement-object gas flow part; and an outer pump electrode disposed at a position different from the measurement-object gas flow part on the base part and corresponding to the inner pump electrode; and a measurement pump cell for detecting a target gas to be measured in the measurement-object gas, the measurement pump cell including: an inner measurement electrode disposed at a position farther from the one end part in the longitudinal direction of the base part than the inner pump electrode on the inner surface of the measurement-object gas flow part; and an outer measurement electrode disposed at a position different from the measurement-object gas flow part on the base part and corresponding to the inner measurement electrode.

The control unit contained in the gas sensor of the present invention includes a pump control part for controlling operation of the adjustment pump cell and the measurement pump cell. The pump control part is configured to perform a startup pump control at a startup of the sensor element, and a steady driving pump control at a steady drive of the sensor element after the startup.

The time of startup of the sensor element refers to a time period from when the gas sensor is turned on until the time when it becomes possible to detect (measure) a target gas to be measured. The time of startup of the sensor element is also referred to as the time of startup of the gas sensor. The time of steady driving of the sensor element refers to a time period during which a target gas to be measured can be detected (measured). The time of steady driving of the sensor element is also referred to as the time of steady driving of the gas sensor. When the startup ends, changing over to steady driving occurs. Usually, the time period from the turning on to the turning off of the gas sensor, excluding the time of startup, corresponds to the time of steady driving. The detection of a target gas to be measured includes the measurement of the concentration of a target gas to be measured.

Hereinafter, an example of an embodiment of a gas sensor of the present invention will be described in detail.

[General Configuration of Gas Sensor]

Figure 1:
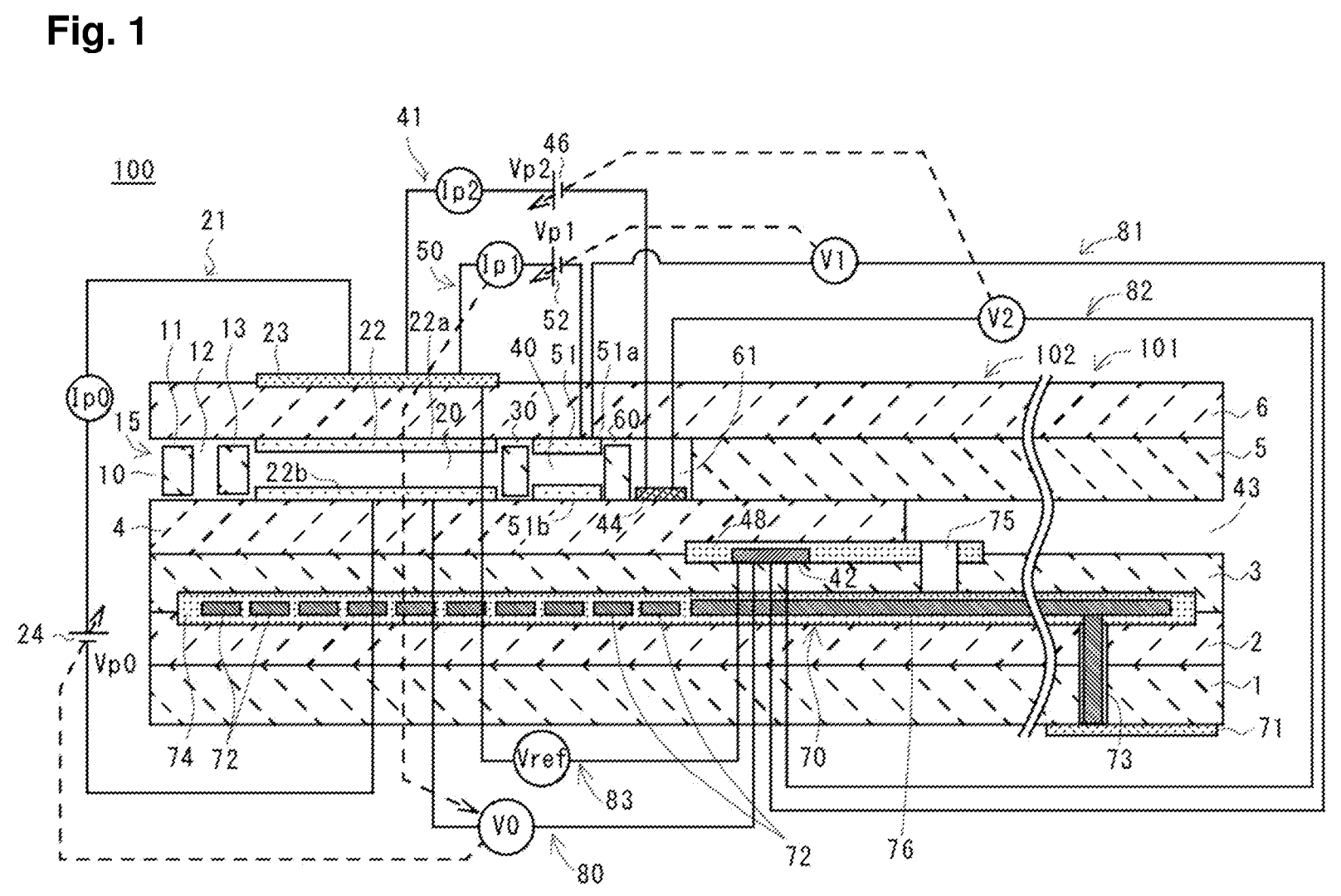

The gas sensor of the present invention will now be described with reference to the drawings. FIG. 1 is a vertical sectional schematic view in the longitudinal direction, showing one example of a general configuration of a gas sensor 100 including a sensor element 101. Hereinafter, based on FIG. 1, the upper side and the lower side in FIG. 1 are respectively defined as top and bottom, and the left side and the right side in FIG. 1 are respectively defined as a front end side and a rear end side.

In FIG. 1, the gas sensor 100 represents one example of a NOx sensor that detects NOx in a measurement-object gas by the sensor element 101, and measures the concentration of NOx.

Figure 2:
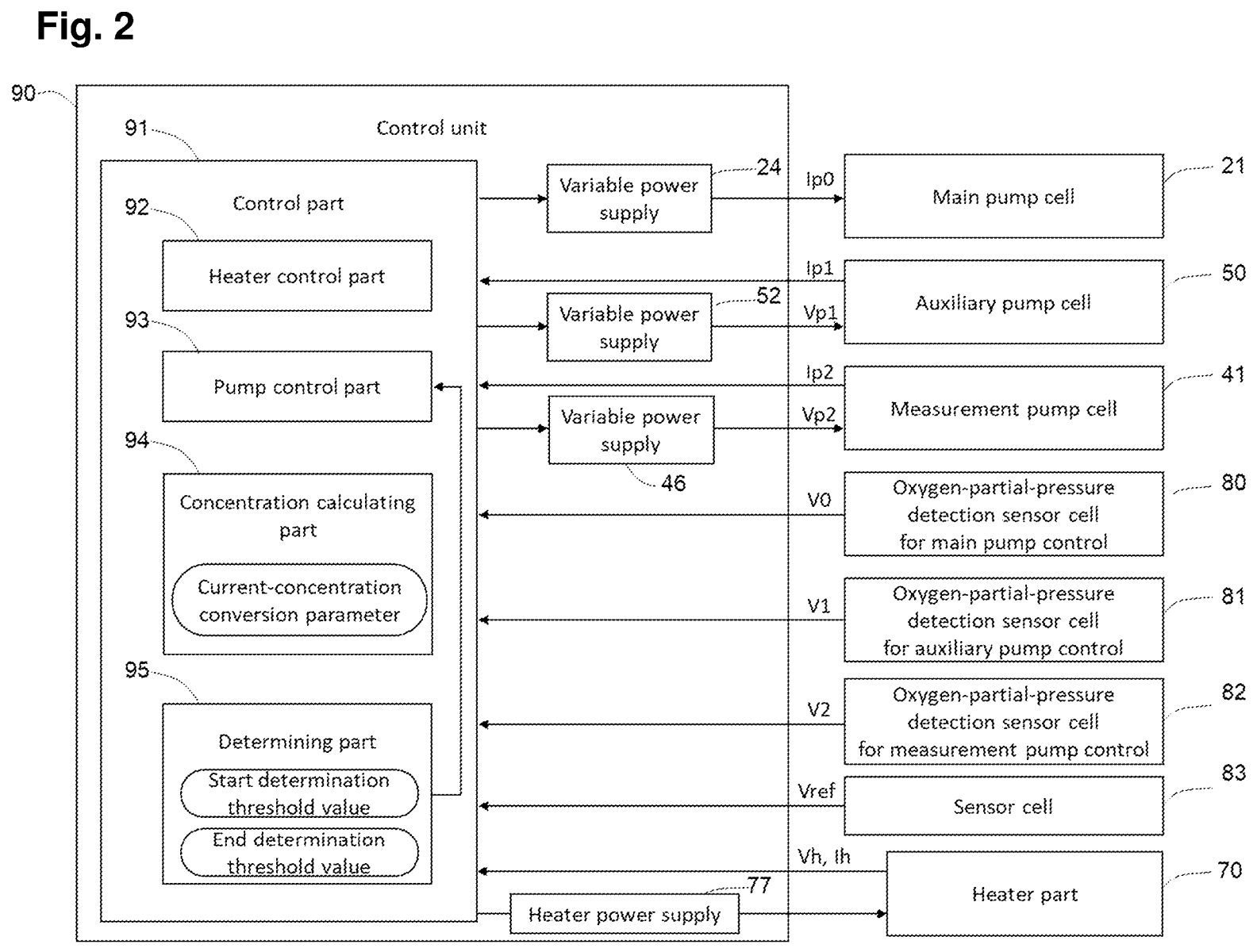

Further, the gas sensor 100 includes a control unit 90 for controlling the sensor element 101. FIG. 2 is a block diagram showing electric connections between the control unit 90 and the sensor element 101.

(Sensor Element)

The sensor element 101 is an element in an elongated plate shape, including a base part 102 having such a structure that a plurality of oxygen-ion-conductive solid electrolyte layers are layered. The elongated plate shape also called a long plate shape or a belt shape. The base part 102 has such a structure that six layers, namely, a first substrate layer 1, a second substrate layer 2, a third substrate layer 3, a first solid electrolyte layer 4, a spacer layer 5, and a second solid electrolyte layer 6, are layered in this order from the bottom side, as viewed in the drawing. Each of the six layers is formed of an oxygen-ion-conductive solid electrolyte layer containing, for example, zirconia ($ZrO_2$) The solid electrolyte forming these six layers is dense and gastight. These six layers all may have the same thickness, or the thickness may vary among the layers. The layers are adhered to each other with an adhesive layer of a solid electrolyte interposed therebetween, and the base part 102 includes the adhesive layer. While a layer configuration composed of the six layers is illustrated in FIG. 1, the layer configuration in the present invention is not limited to this, and any number of layers and any layer configuration are possible.

The sensor element 101 is manufactured, for example, by stacking ceramic green sheets corresponding to the individual layers after conducting predetermined processing, printing of circuit pattern and the like, and then firing the stacked ceramic green sheets so that they are combined together.

A gas inlet 10 is formed between the lower surface of the second solid electrolyte layer 6 and the upper surface of the first solid electrolyte layer 4 in one end part in the longitudinal direction (hereinafter, referred to as a front end part) of the sensor element 101. A measurement-object gas flow part 15 is formed in such a form that a first diffusion-rate limiting part 11, a buffer space 12, a second diffusion-rate limiting part 13, a first internal cavity 20, a third diffusion-rate limiting part 30, a second internal cavity 40, a fourth diffusion-rate limiting part 60, and a third internal cavity 61 communicate in this order in the longitudinal direction from the gas inlet 10.

The gas inlet 10, the buffer space 12, the first internal cavity 20, the second internal cavity 40, and the third internal cavity 61 constitute internal spaces of the sensor element 101. Each of the internal spaces is provided in such a manner that a portion of the spacer layer 5 is hollowed out, and the top of each of the internal spaces is defined by the lower surface of the second solid electrolyte layer 6, the bottom of each of the internal spaces is defined by the upper surface of the first solid electrolyte layer 4, and the lateral surface of each of the internal spaces is defined by the lateral surface of the spacer layer 5.

Each of the first diffusion-rate limiting part 11, the second diffusion-rate limiting part 13, and the third diffusion-rate limiting part 30 is provided as two laterally elongated slits (having the longitudinal direction of the openings in the direction perpendicular to the figure in FIG. 1). Each of the first diffusion-rate limiting part 11, and the second diffusion-rate limiting part 13 may be in such a form that a desired diffusion resistance is created, but the form is not limited to the slits.

The fourth diffusion-rate limiting part 60 is provided as a single laterally elongated slit (having the longitudinal direction of the opening in the direction perpendicular to the figure in FIG. 1) between the spacer layer 5 and the second solid electrolyte layer 6. The fourth diffusion-rate limiting part 60 may be in such a form that a desired diffusion resistance is created, but the form is not limited to the slit.

Also, at a position farther from the front end than the measurement-object gas flow part 15, a reference gas introduction space 43 is disposed between the upper surface of the third substrate layer 3 and the lower surface of the spacer layer 5 at a position where the reference gas introduction space 43 is laterally defined by the lateral surface of the first solid electrolyte layer 4. The reference gas introduction space 43 has an opening in the other end part (hereinafter, referred to as a rear end part) of the sensor element 101. As a reference gas for NOx concentration measurement, for example, air is introduced into the reference gas introduction space 43.

An air introduction layer 48 is a layer formed of porous alumina, and is so configured that a reference gas is introduced into the air introduction layer 48 via the reference gas introduction space 43. The air introduction layer 48 is formed to cover a reference electrode 42.

The reference electrode 42 is an electrode sandwiched between the upper surface of the third substrate layer 3 and the first solid electrolyte layer 4, and as described above, the air introduction layer 48 leading to the reference gas introduction space 43 is disposed around the reference electrode 42. That is, the reference electrode 42 is disposed to be in contact with a reference gas via the air introduction layer 48 which is a porous material, and the reference gas introduction space 43. As will be described later, the reference electrode 42 can be used to measure the oxygen concentration (oxygen partial pressure) in the first internal cavity 20, the second internal cavity 40, and the third internal cavity 61. The reference electrode 42 is formed as a porous cermet electrode (e.g., a cermet electrode of Pt and $ZrO_2$).

In the measurement-object gas flow part 15, the gas inlet 10 is open to the external space, and the measurement-object gas is taken into the sensor element 101 from the external space through the gas inlet 10.

In the present embodiment, the measurement-object gas flow part 15 is in such a form that the measurement-object gas is introduced through the gas inlet 10 that is open on the front end surface of the sensor element 101, however, the present invention is not limited to this form. For example, the measurement-object gas flow part 15 need not have a recess of the gas inlet 10. In this case, the first diffusion-rate limiting part 11 substantially serves as a gas inlet.

For example, the measurement-object gas flow part 15 may have an opening that communicates with the buffer space 12 or a position near the buffer space 12 of the first internal cavity 20, on a lateral surface along the longitudinal direction of the base part 102. In this case, the measurement-object gas is introduced from the lateral surface along the longitudinal direction of the base part 102 through the opening.

Further, for example, the measurement-object gas flow part 15 may be so configured that the measurement-object gas is introduced through a porous body.

The first diffusion-rate limiting part 11 creates a predetermined diffusion resistance to the measurement-object gas taken through the gas inlet 10.

The buffer space 12 is provided to guide the measurement-object gas introduced from the first diffusion-rate limiting part 11 to the second diffusion-rate limiting part 13.

The second diffusion-rate limiting part 13 creates a predetermined diffusion resistance to the measurement-object gas introduced into the first internal cavity 20 from the buffer space 12.

It suffices that the amount of the measurement-object gas to be introduced into the first internal cavity 20 falls within a predetermined range. That is, it suffices that a predetermined diffusion resistance is created in a whole from the front end part of the sensor element 101 to the second diffusion-rate limiting part 13. For example, the first diffusion-rate limiting part 11 may directly communicate with the first internal cavity 20, or the buffer space 12 and the second diffusion-rate limiting part 13 may be absent.

The buffer space 12 is provided to mitigate the influence of pressure fluctuation on the detected value when the pressure of the measurement-object gas fluctuates.

When the measurement-object gas is introduced from outside the sensor element 101 into the first internal cavity 20, the measurement-object gas, which is rapidly taken through the gas inlet 10 into the sensor element 101 due to pressure fluctuation of the measurement-object gas in the external space (pulsations in exhaust pressure if the measurement-object gas is automotive exhaust gas), is not directly introduced into the first internal cavity 20. Rather, the measurement-object gas is introduced into the first internal cavity 20 after the pressure fluctuation of the measurement-object gas is eliminated through the first diffusion-rate limiting part 11, the buffer space 12, and the second diffusion-rate limiting part 13. Thus, the pressure fluctuation of the measurement-object gas introduced into the first internal cavity 20 becomes almost negligible.

The first internal cavity 20 is provided as a space for adjusting the oxygen partial pressure in the measurement-object gas introduced through the second diffusion-rate limiting part 13. The oxygen partial pressure is adjusted by operation of a main pump cell 21.

The sensor element 101 includes an adjustment pump cell for adjusting an oxygen concentration in a measurement-object gas to a desired concentration, and the adjustment pump cell includes an inner pump electrode disposed on an inner surface of the measurement-object gas flow part 15, and an outer pump electrode disposed at a position different from the measurement-object gas flow part 15 on the base part 102 and corresponding to the inner pump electrode. In this embodiment, the main pump cell 21 functions as the adjustment pump cell. Further, an inner main pump electrode 22 functions as the inner pump electrode, and an outer pump electrode 23 functions as the outer pump electrode. In this embodiment, the sensor element 101 is configured to adjust the oxygen concentration more accurately by including, in addition to the main pump cell 21 as the adjustment pump cell, an auxiliary pump cell 50 for further adjusting the oxygen concentration in the measurement-object gas.

The main pump cell 21 is an electrochemical pump cell including the inner main pump electrode 22 disposed on an inner surface of the measurement-object gas flow part 15, and the outer pump electrode 23 disposed at a position different from the measurement-object gas flow part 15 on the base part 102 (in FIG. 1, on an outer surface of the base part 102) and corresponding to the inner main pump electrode 22. The phrase "corresponding to the inner main pump electrode 22" means that the outer pump electrode 23 and the inner main pump electrode 22 are provided with the second solid electrolyte layer 6 being interposed therebetween.

That is, the main pump cell 21 is an electrochemical pump cell composed of the inner main pump electrode 22 having a ceiling electrode portion 22a disposed over substantially the entire surface of the lower surface of the second solid electrolyte layer 6 that faces the first internal cavity 20, the outer pump electrode 23 disposed on a region of the upper surface of the second solid electrolyte layer 6 that corresponds to the ceiling electrode portion 22a so as to be exposed to the external space, and the second solid electrolyte layer 6 sandwiched between the inner main pump electrode 22 and the outer pump electrode 23.

The inner main pump electrode 22 is formed to span the upper and lower solid electrolyte layers (the second solid electrolyte layer 6 and the first solid electrolyte layer 4) that define the first internal cavity 20 and the spacer layer 5 that defines the lateral wall. Specifically, the ceiling electrode portion 22$a$ is formed on the lower surface of the second solid electrolyte layer 6 that defines the ceiling surface of the first internal cavity 20, and a bottom electrode portion 22$b$ is formed on the upper surface of the first solid electrolyte layer 4 that defines the bottom surface of the first internal cavity 20. Also, lateral electrode portions (not shown) are formed on the lateral wall surfaces (inner surface) of the spacer layer 5 that form both lateral wall parts of the first internal cavity 20 so as to connect the ceiling electrode portion 22$a$ and the bottom electrode portion 22$b$. Thus, the inner main pump electrode 22 is provided as a tunnel-like structure in the area where the lateral electrode portions are disposed.

The inner main pump electrode 22 and the outer pump electrode 23 are porous cermet electrodes (electrodes in a state that a metal component and a ceramic component are mixed). The ceramic component to be used is not particularly limited, but is preferably an oxygen-ion-conductive solid electrolyte as in the case of the base part 102. For example, $ZrO_2$ can be used as the ceramic component.

The inner main pump electrode 22 to be in contact with a measurement-object gas is formed using a material having a weakened reducing ability with respect to a NOx component in the measurement-object gas. The inner main pump electrode 22 preferably contains a noble metal having catalytic activity (e.g., at least one of Pt, Rh, Ir, Ru, and Pd) and a noble metal (e.g., Au, Ag) that reduces the catalytic activity of a noble metal having catalytic activity with respect to a target gas to be measured (in this embodiment, NOx). In this embodiment, the inner main pump electrode 22 is formed as a porous cermet electrode made of Pt containing 1% of Au and $ZrO_2$ The outer pump electrode 23 may contain the above-described noble metal having catalytic activity. Similarly, the reference electrode 42 may contain the above-described noble metal having catalytic activity. In this embodiment, the outer pump electrode 23 is formed as a porous cermet electrode made of Pt and $ZrO_2$.

In the main pump cell 21, a desired pump voltage Vp0 is applied between the inner main pump electrode 22 and the outer pump electrode 23 by a variable power supply 24 to flow a pump current Ip0 between the inner main pump electrode 22 and the outer pump electrode 23 in either a positive or negative direction, and thus it is possible to pump out oxygen in the first internal cavity 20 to the external space or pump oxygen into the first internal cavity 20 from the external space.

To detect the oxygen concentration (oxygen partial pressure) in the atmosphere in the first internal cavity 20, the inner main pump electrode 22, the second solid electrolyte layer 6, the spacer layer 5, the first solid electrolyte layer 4, the third substrate layer 3, and the reference electrode 42 form an electrochemical sensor cell, namely, an oxygen-partial-pressure detection sensor cell 80 for main pump control.

The oxygen concentration (oxygen partial pressure) in the first internal cavity 20 can be detected from an electromotive force V0 measured in the oxygen-partial-pressure detection sensor cell 80 for main pump control. In addition, at the time of steady control of the gas sensor 100, the pump current Ip0 is controlled by performing feedback control of the pump voltage Vp0 in the variable power supply 24 so that the electromotive force V0 is constant. Thus, the oxygen concentration in the first internal cavity 20 can be maintained at a predetermined constant value.

The third diffusion-rate limiting part 30 creates a predetermined diffusion resistance to the measurement-object gas whose oxygen concentration (oxygen partial pressure) has been controlled in the first internal cavity 20 by the operation of the main pump cell 21, and guides the measurement-object gas into the second internal cavity 40.

The second internal cavity 40 is provided as a space for adjusting the oxygen partial pressure in the measurement-object gas introduced through the third diffusion-rate limiting part 30 more accurately. The oxygen partial pressure is adjusted by operation of an auxiliary pump cell 50. The sensor element 101 may be configured without the second internal cavity 40 and the auxiliary pump cell 50. From the viewpoint of adjusting accuracy of oxygen partial pressure, it is more preferred that the second internal cavity 40 and the auxiliary pump cell 50 be provided.

After the oxygen concentration (oxygen partial pressure) in the measurement-object gas is adjusted in advance in the first internal cavity 20, the measurement-object gas is introduced through the third diffusion-rate limiting part 30, and is further subjected to adjustment of the oxygen partial pressure by the auxiliary pump cell 50 in the second internal cavity 40. Thus, the oxygen concentration in the second internal cavity 40 can be kept constant with high accuracy, and the NOx concentration can be measured with high accuracy in the gas sensor 100.

The auxiliary pump cell 50 is an electrochemical pump cell including an inner auxiliary pump electrode (in this embodiment, an auxiliary pump electrode 51) disposed at a position farther from the front end portion in the longitudinal direction of the base part 102 than the inner pump electrode (in this embodiment, the inner main pump electrode 22) on the inner surface of the measurement-object gas flow part 15 and an outer auxiliary pump electrode disposed at a position different from the measurement-object gas flow part 15 on the base part 102 (in FIG. 1, on the outer surface of the base part 102) and corresponding to the inner auxiliary pump electrode. In this embodiment, the outer pump electrode 23 disposed on the outer surface of the base part 102 functions also as the outer auxiliary pump electrode. The phrase "corresponding to the inner auxiliary pump electrode" means that the outer pump electrode 23 and the auxiliary pump electrode 51 are provided with the second solid electrolyte layer 6 being interposed therebetween.

That is, the auxiliary pump cell 50 is an auxiliary electrochemical pump cell composed of the auxiliary pump electrode 51 having a ceiling electrode portion 51$a$ disposed on substantially the entire surface of lower surface of the second solid electrolyte layer 6 facing with the second internal cavity 40, the outer pump electrode 23 (the outer auxiliary electrode is not limited to the outer pump electrode 23, but may be any suitable electrode outside the sensor element 101), and the second solid electrolyte layer 6.

This auxiliary pump electrode 51 is disposed in the second internal cavity 40 in a tunnel-like structure similar to the inner main pump electrode 22 disposed in the first internal cavity 20 described previously. Specifically, in the tunnel-like structure, the ceiling electrode portion 51$a$ is formed on the lower surface of the second solid electrolyte layer 6 that defines the ceiling surface of the second internal cavity 40, a bottom electrode portion 51$b$ is formed on the upper surface of the first solid electrolyte layer 4 that defines the bottom surface of the second internal cavity 40, and lateral electrode portions (not shown) connecting the ceiling electrode portion 51$a$ and the bottom electrode portion 51$b$ are formed on the wall surfaces of the spacer layer 5 that define the lateral walls of the second internal cavity 40.

It is to be noted that the auxiliary pump electrode 51 is formed using a material having a weakened ability to reduce a NOx component in the measurement-object gas, as with the case of the inner main pump electrode 22. The auxiliary pump electrode 51, as with the case of the inner main pump electrode 22, preferably contains a noble metal having catalytic activity (e.g., at least one of Pt, Rh, Jr, Ru, and Pd) and a noble metal (e.g., Au, Ag) that reduces the catalytic activity of a noble metal having catalytic activity with respect to a target gas to be measured (in this embodiment, NOx). In this embodiment, the auxiliary pump electrode 51 is formed as a porous cermet electrode made of Pt containing 1% of Au and $ZrO_2$.

In the auxiliary pump cell 50, by applying a desired voltage Vp1 between the auxiliary pump electrode 51 and the outer pump electrode 23 by a variable power supply 52, it is possible to pump out oxygen in the atmosphere in the second internal cavity 40 to the external space, or pump the oxygen into the second internal cavity 40 from the external space.

To control the oxygen partial pressure in the atmosphere in the second internal cavity 40, the auxiliary pump electrode 51, the reference electrode 42, the second solid electrolyte layer 6, the spacer layer 5, the first solid electrolyte layer 4, and the third substrate layer 3 constitute an electrochemical sensor cell, namely, an oxygen-partial-pressure detection sensor cell 81 for auxiliary pump control.

At the time of the steady drive of the gas sensor 100, the auxiliary pump cell 50 performs pumping with the variable power supply 52 whose voltage is controlled on the basis of an electromotive force V1 detected by the oxygen-partial-pressure detection sensor cell 81 for auxiliary pump control. Thus, the oxygen partial pressure in the atmosphere in the second internal cavity 40 is controlled to such a low partial pressure that does not substantially affect measurement of NOx.

In addition, a pump current Ip1 is used for control of the electromotive force V0 of the oxygen-partial-pressure detection sensor cell 80 for main pump control. Specifically, the pump current Ip1 is input to the oxygen-partial-pressure detection sensor cell 80 for main pump control as a control signal to control the electromotive force V0, and thus the gradient of the oxygen partial pressure in the measurement-object gas introduced into the second internal cavity 40 from the third diffusion-rate limiting part 30 is controlled to remain constant. In using as a NOx sensor, the oxygen concentration in the second internal cavity 40 is kept at a constant value of about 0.001 ppm by the actions of the main pump cell 21 and the auxiliary pump cell 50.

The fourth diffusion-rate limiting part 60 creates a predetermined diffusion resistance to the measurement-object gas whose oxygen concentration (oxygen partial pressure) has been controlled to further low in the second internal cavity 40 by the operation of the auxiliary pump cell 50, and guides the measurement-object gas into the third internal cavity 61.

The third internal cavity 61 is provided as a space for measuring nitrogen oxide (NOx) concentration in the measurement-object gas introduced through the fourth diffusion-rate limiting part 60. By the operation of a measurement pump cell 41, NOx concentration is measured.

The measurement pump cell 41 is an electrochemical pump cell including an inner measurement electrode (in this embodiment, a measurement electrode 44) disposed at a position farther from the front end portion in the longitudinal direction of the base part 102 than the inner pump electrode (in this embodiment, the inner main pump electrode 22) on the inner surface of the measurement-object gas flow part 15 and an outer measurement electrode disposed at a position different from the measurement-object gas flow part 15 on the base part 102 and corresponding to the inner measurement electrode. In this embodiment, the outer pump electrode 23 disposed on the outer surface of the base part 102 functions also as the outer measurement electrode. The phrase "corresponding to the inner measurement electrode" means that the outer pump electrode 23 and the measurement electrode 44 are provided with the second solid electrolyte layer 6, the spacer layer 5, and the first solid electrolyte layer 4 being interposed therebetween. In this embodiment, a measurement electrode 44 is disposed at a position farther from the front end portion in the longitudinal direction of the base part 102 than the inner main pump electrode 22 and the auxiliary pump electrode 51 on the inner surface of the measurement-object gas flow part 15.

That is, the measurement pump cell 41 is an electrochemical pump cell composed of the measurement electrode 44 disposed on the upper surface of the first solid electrolyte layer 4 facing with the third internal cavity 61, the outer pump electrode 23 (the outer electrode is not limited to the outer pump electrode 23, but may be any suitable electrode outside the sensor element 101), the second solid electrolyte layer 6, the spacer layer 5, and the first solid electrolyte layer 4. The measurement pump cell 41 measures NOx concentration in the measurement-object gas in the third internal cavity 61.

The measurement electrode 44 is a porous cermet electrode. The measurement electrode 44 functions also as a NOx reduction catalyst that reduces NOx present in the atmosphere in the third internal cavity 61. The measurement electrode 44 is an electrode containing a noble metal having catalytic activity (e.g., at least one of Pt, Rh, Jr, Ru, and Pd). It is preferred that the measurement electrode 44 does not contain a noble metal (e.g., Au, Ag) that reduces the catalytic activity of a noble metal having catalytic activity with respect to a target gas to be measured (in this embodiment, NOx). In this embodiment, the measurement electrode 44 is formed as a porous cermet electrode made of Pt and Rh, and $ZrO_2$ To detect the oxygen partial pressure around the measurement electrode 44, the second solid electrolyte layer 6, the spacer layer 5, the first solid electrolyte layer 4, the third substrate layer 3, the measurement electrode 44, and the reference electrode 42 constitute an electrochemical sensor cell, namely an oxygen-partial-pressure detection sensor cell 82 for measurement pump control. At the time of the steady drive of the gas sensor 100, a variable power supply 46 is controlled on the basis of an electromotive force V2 detected by the oxygen-partial-pressure detection sensor cell 82 for measurement pump control.

The measurement-object gas introduced into the second internal cavity 40 reaches the measurement electrode 44 in the third internal cavity 61 through the fourth diffusion-rate limiting part 60 under the condition that the oxygen partial pressure is controlled. Nitrogen oxide in the measurement-object gas around the measurement electrode 44 is reduced ($2NO \rightarrow N_2 + O_2$) to generate oxygen. The generated oxygen is to be pumped by the measurement pump cell 41, and at this time, a voltage Vp2 of the variable power supply 46 is controlled so that the electromotive force V2 detected by the oxygen-partial-pressure detection sensor cell 82 for measurement pump control is constant. Since the amount of oxygen generated around the measurement electrode 44 is proportional to the concentration of nitrogen oxide in the measurement-object gas, nitrogen oxide concentration in the measurement-object gas is calculated by using the pump current Ip2 in the measurement pump cell 41.

Also, the second solid electrolyte layer 6, the spacer layer 5, the first solid electrolyte layer 4, the third substrate layer 3, the outer pump electrode 23, and the reference electrode 42 constitute an electrochemical sensor cell 83, and it is possible to detect the oxygen partial pressure in the measurement-object gas outside the sensor by an electromotive force Vref obtained by the sensor cell 83.

The sensor element 101 further includes a heater part 70 that functions as a temperature regulator of heating and maintaining the temperature of the sensor element 101 so as to enhance the oxygen ion conductivity of the solid electrolyte. The heater part 70 includes a heater electrode 71, a heater 72, a heater lead 76, a through hole 73, a heater insulating layer 74, and a pressure relief vent 75.

The heater electrode 71 is an electrode formed in contact with the lower surface of the first substrate layer 1. The power can be supplied to the heater part 70 from the outside by connecting the heater electrode 71 with a heater power supply 77 that is an external power supply.

The heater 72 is an electrical resistor sandwiched by the second substrate layer 2 and the third substrate layer 3 from top and bottom. The heater 72 is connected with the heater electrode 71 via a heater lead 76 that connects with the heater 72 and extends in the rear end side in the longitudinal direction of the sensor element 101, and the through hole 73. The heater 72 is externally powered through the heater electrode 71 to generate heat, and heats and maintains the temperature of the solid electrolyte forming the sensor element 101.

The heater 72 is embedded over the whole area from the first internal cavity 20 to the third internal cavity 61 so that the temperature of the entire sensor element 101 can be adjusted to such a temperature that activates the solid electrolyte. The temperature may be adjusted so that the main pump cell 21, the auxiliary pump cell 50, and the measurement pump cell 41 are operable. It is not necessary that the whole area is adjusted to the same temperature, but the sensor element 101 may have temperature distribution.

In the sensor element 101 of the present embodiment, the heater 72 is embedded in the base part 102, but this form is not limitative. The heater 72 may be disposed to heat the base part 102. That is, the heater 72 may heat the sensor element 101 to develop oxygen ion conductivity with which the main pump cell 21, the auxiliary pump cell 50, and the measurement pump cell 41 are operable. For example, the heater 72 may be embedded in the base part 102 as in the present embodiment. Alternatively, for example, the heater part 70 may be formed as a heater substrate that is separate from the base part 102, and may be disposed at a position adjacent to the base part 102.

The heater insulating layer 74 is formed of an insulator such as alumina on the upper and lower surfaces of the heater 72 and the heater lead 76. The heater insulating layer 74 is formed to ensure electrical insulation between the second substrate layer 2, and the heater 72 and the heater lead 76, and electrical insulation between the third substrate layer 3, and the heater 72 and the heater lead 76.

The pressure relief vent 75 extends through the third substrate layer 3 so that the heater insulating layer 74 and the reference gas introduction space 43 communicate with each other. The pressure relief vent 75 can mitigate an increase in internal pressure due to temperature rise in the heater insulating layer 74. The pressure relief vent 75 may be absent.

The above-described sensor element 101 is incorporated into the gas sensor 100 in such a form that the front end part of the sensor element 101 comes into contact with the measurement-object gas, and the rear end part of the sensor element 101 comes into contact with the reference gas.

(Control Unit)

The gas sensor 100 of this embodiment includes the sensor element 101 described above and the control unit 90 for controlling the sensor element 101. In the gas sensor 100, each of the electrodes 22, 23, 51, 44, and 42 of the sensor element 101 is electrically connected to the control unit 90 through a lead wire not shown. FIG. 2 is a block diagram showing electric connections between the control unit 90 and the respective pump cells 21, 50, and 41, the respective sensor cells 80, 81, 82, and 83, and the heater part 70 of the sensor element 101. The control unit 90 includes the above-described variable power supplies 24, 46, and 52 and heater power supply 77 and a control part 91. The control part 91 includes a heater control part 92, a pump control part 93, a concentration calculating part 94, and a determining part 95.

The control part 91 is realized by a general-purpose or dedicated computer, and functions as the heater control part 92, the pump control part 93, the concentration calculating part 94, and the determining part 95 are realized by a CPU, a memory or the like installed in the computer. It is to be noted that when NOx contained in exhaust gas from the engine of a car is a target gas to be measured by the gas sensor 100 and the sensor element 101 is attached to an exhaust gas path, some or all of the functions of the control unit 90 (especially, the control unit 91) may be realized by an electronic control unit (ECU) installed in the car.

The control part 91 is configured to acquire an electromotive force (V0, V1, V2, Vref) in each of the sensor cells 80, 81, 82, and 83, a pump current (Ip0, Ip1, Ip2) in each of the pump cells 21, 50, and 41, and a heater voltage Vh and a heater current Ih in the heater part 70 of the sensor element 101. Further, the control part 91 is configured to output control signals to the variable power supplies 24, 52 and 46, and the heater power supply 77.

The heater control part 92 is configured to perform a heater control that includes heating the base part 102 by the heater 72 to raise the temperature of the base part 102 (through the starting temperature of a startup pump control that will be described later further up) to a predetermined steady driving temperature and maintaining the temperature of the base part 102 at the steady driving temperature. The temperature of the base part 102 is roughly the temperature of the sensor element 101. For example, control may be performed so that the temperature itself of the base part 102 (or the sensor element 101) is maintained at the steady driving temperature. Alternatively, for example, the base part 102 may be maintained at the steady driving temperature as a result of control for the purpose of maintaining the heater 72 at a predetermined temperature. In this embodiment, the heater control part 92 is configured to heat the heater 72 and maintain the temperature of the heater 72 at a predetermined temperature (referred to as a set temperature $Th_{SET}$).

In order to heat the heater 72, known various control methods can be used. For example, the heater 72 may be heated by applying a certain voltage to the heater 72. The output of the heater power supply 77 may be controlled on the basis of the resistance value of the heater 72. Alternatively, the output of the heater power supply 77 may be controlled on the basis of at least one of resistance values in the main pump cell 21, the auxiliary pump cell 50, and the measurement pump cell 41.

For example, the heater control part 92 performs feedback control of a control signal output to the heater power supply 77 on the basis of a heater resistance value Rh ($=$Vh/Ih) calculated from the heater voltage Vh and the heater current Ih in the heater 72 so that the heater 72 reaches a target temperature.

The pump control part 93 is configured to control the operation of the adjustment pump cell (in this embodiment, the main pump cell 21) and the measurement pump cell 41. In this embodiment, the pump control part 93 also controls the operation of the auxiliary pump cell 50.

The pump control part 93 is configured to perform a startup pump control at a startup of the sensor element 101 (the gas sensor 100), and a steady driving pump control at a steady drive of the sensor element 101 (the gas sensor 100) after the startup.

As described above, the time of startup of the sensor element 101 refers to a time period from when the gas sensor 100 is turned on until the time when it becomes possible to detect (measure) a target gas to be measured. The time of startup of the sensor element 101 is also referred to as the time of startup of the gas sensor 100. The time of steady driving of the sensor element 101 refers to a time period during which a target gas to be measured can be detected (measured). The time of steady driving of the sensor element 101 is also referred to as the time of steady driving of the gas sensor 100. When the startup ends, changing over to steady driving occurs. Usually, the time period from the turning on to the turning off of the gas sensor, excluding the time of startup, corresponds to the time of steady driving.

That is, the time of startup of the sensor element 101 (the gas sensor 100) refers to a time period from the time when the heater control part 92 starts heating of the heater 72 until the time when it becomes possible for the pump control part 93 to measure a target gas to be measured due to the activation of the solid electrolyte forming the sensor element 101 caused by heating with the heater 72. The steady driving refers to a state where the heater control part 92 maintains the temperature of the heater 72 (or the temperature of the sensor element 101) at a desired temperature and the pump control part 93 measures a target gas to be measured.

First, the steady driving pump control will be described which is performed at the time of steady driving after the startup of the gas sensor 100. The steady driving pump control is a control to adjust the oxygen concentration in a measurement-object gas to a desired concentration by the adjustment pump cell (in this embodiment, by the main pump cell 21) and detect a target gas to be measured in the measurement-object gas by the measurement pump cell 41. In this embodiment, in addition to the main pump cell 21, the auxiliary pump cell 50 is used to adjust the oxygen concentration in the measurement-object gas.

In the steady driving pump control, the pump control part 93 performs feedback control of the pump voltage Vp0 of the variable power supply 24 in the main pump cell 21 so that the electromotive force V0 in the oxygen-partial-pressure detection sensor cell 80 for main pump control is at a constant value (referred to as a set value $V0_{SET}$). The application direction or the voltage value of the pump voltage Vp0 varies depending on an oxygen concentration or a concentration of a reducing gas such as hydrocarbons HC in the measurement-object gas, the configuration and the intended use of the gas sensor 100, or the like. However, the pump voltage Vp0 may be roughly in the range of 1 V or less as an absolute value. The electromotive force V0 indicates the oxygen partial pressure in the vicinity of the inner main pump electrode 22, and therefore making the electromotive force V0 constant means that the oxygen partial pressure in the vicinity of the inner main pump electrode 22 is made constant. As a result, the pump current Ip0 in the main pump cell 21 varies depending on the oxygen concentration in the measurement-object gas.

When the oxygen partial pressure in the measurement-object gas is higher than the oxygen partial pressure corresponding to the set value $V0_{SET}$, the main pump cell 21 pumps oxygen out from the first internal cavity 20. On the other hand, when the oxygen partial pressure in the measurement-object gas is lower than the oxygen partial pressure corresponding to the set value $V0_{SET}$ (for example, when hydrocarbons HC or the like are contained), the main pump cell 21 pumps oxygen into the first internal cavity 20 from the space outside the sensor element 101. Therefore, the value of the pump current Ip0 may be either positive or negative.

The pump control part 93 performs feedback control of the pump voltage Vp1 of the variable power supply 52 in the auxiliary pump cell 50 so that the electromotive force V1 in the oxygen-partial-pressure detection sensor cell 81 for auxiliary pump control is at a constant value (referred to as a set value $V1_{SET}$). The voltage value of the pump voltage Vp1 varies depending on the configuration and the intended use of the gas sensor 100, or the like. However, the pump voltage Vp1 may be roughly in the range of 0.8 V or less. The electromotive force V1 indicates the oxygen partial pressure in the vicinity of the auxiliary pump electrode 51, and therefore making the electromotive force V1 constant means that the oxygen partial pressure in the vicinity of the auxiliary pump electrode 51 is made constant. The set value $V1_{SET}$ is set as a value such that the oxygen partial pressure (oxygen concentration) in the atmosphere in the second internal cavity 40 is thereby controlled to be a low partial pressure (oxygen concentration) that does not substantially affect measurement of NOx.

At the same time, feedback control is performed to set the set value $V0_{SET}$ of the electromotive force V0 on the basis of the pump current Ip1 in the auxiliary pump cell 50 so that the pump current Ip1 is at a constant value (referred to as a set value $Ip1_{SET}$). Specifically, the pump current Ip1 is input, as a control signal, to the oxygen-partial-pressure detection sensor cell 80 for main pump control, and the electromotive force V0 therein is controlled to be the set value $V0_{SET}$ set on the basis of the pump current Ip1 so that the oxygen partial pressure in the measurement-object gas introduced through the third diffusion-rate limiting part 30 into the second internal cavity 40 is controlled to have a gradient that is always constant. The set value $V0_{SET}$ is set as a value such that the oxygen concentration in the first internal cavity 20 is thereby controlled to be a predetermined low concentration. In use as the NOx sensor, the oxygen concentration in the second internal cavity 40 is maintained at a constant value of approximately 0.001 ppm by the action of the main pump cell 21 and the auxiliary pump cell 50. That is to say, the oxygen concentration in the measurement-object gas introduced through the fourth diffusion-rate limiting part 60 into the third internal cavity 61 is considered to be maintained at a constant value of approximately 0.001 ppm.

The pump control part 93 performs feedback control of the pump voltage Vp2 of the variable power supply 46 in the measurement pump cell 41 so that the electromotive force V2 detected in the oxygen-partial-pressure detection sensor cell 82 for measurement pump control is at a constant value (referred to as a set value $V2_{SET}$). The voltage value of the pump voltage Vp2 varies depending on a concentration of a target gas to be measured (in this embodiment, a NOx concentration) in the measurement-object gas, the configuration and the intended use of the gas sensor 100, or the like. However, the pump voltage Vp2 may be roughly 0.2 V to 0.4 V. In the measurement electrode 44, nitrogen oxide in the measurement-object gas is reduced ($2NO \rightarrow N_2 + O_2$) to generate oxygen. The pump control part 93 pumps the generated oxygen out by the measurement pump cell 41 so that the electromotive force V2 becomes the set value $V2_{SET}$. The set value $V2_{SET}$ can be set as a value such that substantially all of NOx is decomposed at the measurement electrode 44. By setting the set value $V2_{SET}$ in this way, substantially all of NOx in the measurement-object gas is detected as a measurement pump current Ip2 in the measurement pump cell 41. To be precise, the measurement pump current Ip2 includes electric current generated by low concentration of oxygen after control by the main pump cell 21 and the auxiliary pump cell 50, and electric current generated by oxygen derived from NOx in the measurement-object gas. By maintaining the oxygen concentration in the measurement-object gas reaching the measurement electrode 44 at a constant level as described above, oxygen derived from NOx in the measurement-object gas can precisely be measured by the measurement pump current Ip2. As a result, the measurement pump current Ip2 can be detected as a current value corresponding to the concentration of NOx.

It is to be noted that the set values $V0_{SET}$, $Ip1_{SET}$, $V1_{SET}$, and $V2_{SET}$ are stored as control values (target values) in a memory of the control part 91 which functions as the pump control part 93. On the basis of these control values, a CPU of the control part 91 which functions as the pump control part 93 performs the steady driving pump control of the gas sensor 100.

Next, the startup pump control performed at the time of startup of the gas sensor 100 will be described. The pump control part 93 performs the startup pump control in a time period included in the time of startup of the gas sensor 100. The startup pump control may be started at the same time with the activation of the gas sensor 100 or may be started with a delay from the activation of the gas sensor 100. When the startup pump control ends, the pump control part 93 switches to the steady driving pump control.

The startup pump control is a control to apply, between the inner pump electrode (the inner main pump electrode 22) and the outer pump electrode (the outer pump electrode 23) of the adjustment pump cell (in this embodiment, the main pump cell 21), a startup voltage of the adjustment pump cell that is higher than a voltage applied to the adjustment pump cell in the steady driving pump control; and to apply, between the inner measurement electrode (the measurement electrode 44) and the outer measurement electrode (the outer pump electrode 23) of the measurement pump cell 41, a startup voltage of the measurement pump cell 41 that is higher than a voltage applied to the measurement pump cell in the steady driving pump control and lower than the startup voltage of the adjustment pump cell.

That is, in the startup pump control of the present embodiment, the pump control part 93 applies, between the inner main pump electrode 22 and the outer pump electrode 23 of the main pump cell 21, a startup voltage of the main pump cell 21 (referred to as a main pump startup voltage $Vp0_{INITIAL}$) that is higher than a pump voltage Vp0 applied in the steady driving pump control; and applies, between the measurement electrode 44 and the outer pump electrode 23 of the measurement pump cell 41, a startup voltage of the measurement pump cell 41 (referred to as a measurement pump startup voltage $Vp2_{INITIAL}$) that is higher than a pump voltage Vp2 applied in the steady driving pump control and lower than the main pump startup voltage $Vp0_{INITIAL}$.

Also, in the startup pump control, the pump control part 93 may further apply, between the inner auxiliary pump electrode (the auxiliary pump electrode 51) and the outer auxiliary pump electrode (the outer pump electrode 23) of the auxiliary pump cell 50, a startup voltage of the auxiliary pump cell that is higher than a voltage applied to the auxiliary pump cell in the steady driving pump control, equal to or lower than the startup voltage of the adjustment pump cell, and higher than the startup voltage of the measurement pump cell.

That is, in the startup pump control, the pump control part 93 may apply, between the auxiliary pump electrode 51 and the outer pump electrode 23, a startup voltage of the auxiliary pump cell 50 (referred to as a auxiliary pump startup voltage $Vp1_{INITIAL}$) that is higher than a pump voltage Vp1 applied to the auxiliary pump cell 50 in the steady driving pump control, equal to or lower than the startup voltage of the main pump cell 21 (the main pump startup voltage $Vp0_{INITIAL}$), and higher than the startup voltage of the measurement pump cell 41 (the measurement pump startup voltage $Vp2_{INITIAL}$). It is to be noted that when the startup voltage of the auxiliary pump cell 50 (the auxiliary pump startup voltage $Vp1_{INITIAL}$) is lower than the startup voltage of the main pump cell 21 (the main pump startup voltage $Vp0_{INITIAL}$), the startup voltage of the auxiliary pump cell 50 (the auxiliary pump startup voltage $Vp1_{INITIAL}$) and the startup voltage of the measurement pump cell 41 (the measurement pump startup voltage $Vp2_{INITIAL}$) may be equal.

Before the activation of the gas sensor 100, the inside of the measurement-object gas flow part 15 is filled with a gas atmosphere around the gas sensor 100 (e.g., with an air atmosphere). Therefore, the oxygen concentration in the third internal cavity 61 before the activation of the gas sensor 100 is usually often higher than that at the time of steady driving of the gas sensor 100. That is, the amount of oxygen present in the vicinity of the measurement electrode 44 is larger than that at the time of steady driving. When the gas sensor 100 is activated in such a state, it is necessary for the measurement pump cell 41 to pump out a larger amount of oxygen at the time of startup than at the time of steady driving.

The gas sensor 100 requires time to start measurement of the concentration of a target gas to be measured after its activation. This required time is called light-off time. The light-off time is a time period from the time when the heater 72 of the gas sensor 100 is turned on until the time when it becomes possible to detect (measure) a target gas to be measured. In other words, the light-off time is a time required for the main pump cell 21, the auxiliary pump cell 50, and the measurement pump cell 41 to control the oxygen concentration in a measurement-object gas in the measurement-object gas flow part 15 to be that at the time of steady driving after the start of heating of the heater 72.

In the startup pump control, a startup voltage that is higher than a voltage applied in the steady driving pump control is applied to each of the main pump cell 21, the auxiliary pump cell 50, and the measurement pump cell 41. As a result, it is possible to pass relatively large pump current Ip0, pump current Ip1, and pump current Ip2 through the pump cells 21, 50, and 41, respectively, and therefore to efficiently pump out oxygen having existed in the measurement-object gas flow part 15 before the activation of the gas sensor 100 and oxygen continuously entering through the gas inlet 10. Therefore, it is possible to more quickly control the oxygen concentration in a measurement-object gas in the measurement-object gas flow part 15 to be that at the time of steady driving. That is, it is possible to more quickly control the oxygen concentration in a measurement-object gas reaching the measurement electrode 44 to be that at the time of steady driving. As a result, it is possible to shorten the light-off time.

In the sensor element 101, the first internal cavity 20, the second internal cavity 40, and the third internal cavity 61 are serially disposed in this order from the front end portion of the sensor element 101. The main pump cell 21 pumps out oxygen from the first internal cavity 20, the auxiliary pump cell 50 pumps out oxygen from the second internal cavity 40, and the measurement pump cell 41 pumps out oxygen from the third internal cavity 61. When a pump voltage is applied to each of the pump cells 21, 50, and 41 in such a sensor element 101, the oxygen concentration is highest in the first internal cavity 20 nearest to the gas inlet 10 and reduces as the distance from the gas inlet 10 increases, that is, reduces in the order of the second internal cavity 40 and the third internal cavity 61.

When there is a large difference between the oxygen concentration in the first internal cavity 20 and/or the second internal cavity 40 and the oxygen concentration in the third internal cavity 61, a little amount of oxygen flows into the third internal cavity 61 due to a concentration gradient caused by such an oxygen concentration difference. It has been found that, as a result of that, there is a case where it takes time for the oxygen concentration in the third internal cavity 61, that is, the oxygen concentration in the vicinity of the measurement electrode 44 to become that at the time of steady driving.

According to the study by the present inventor, oxygen in the first internal cavity 20 nearest to the gas inlet 10 can more quickly be pumped out by applying a high main pump startup voltage $Vp0_{INITIAL}$ in the main pump cell 21. That is, the oxygen concentration in the first internal cavity 20 can more quickly be reduced. As a result, it is possible to reduce the difference between the oxygen concentration in the first internal cavity 20, and the oxygen concentration in the second internal cavity 40 and the oxygen concentration in the third internal cavity 61, thereby reducing the amount of oxygen flowing into the third internal cavity 61 due to concentration gradient. The present inventor has found that this makes it possible to reduce the time to control the oxygen concentration in the vicinity of the measurement electrode 44 to be that at the time of steady driving.

The pump current increases as the pump voltage applied in each of the pump cells 21, 50, and 41 increases. Therefore, oxygen in the measurement-object gas flow part 15 can more quickly be pumped out by applying higher pump voltages. However, it has been found that when an excessively high pump voltage is applied in the pump cell, there is a case where cracking occurs in the internal structure of the sensor element 101.

When the pump voltage is applied to the pump cell, oxygen in a measurement-object gas is pumped out from the internal cavity on the basis of the pump voltage. However, when the pump voltage is excessively high, there is a case where a pump voltage that is higher than that necessary to pump out substantially all of oxygen in a measurement-object gas is applied to the pump cell. In this case, oxygen constituting the solid electrolyte (e.g., zirconia $ZrO_2$) included in the pump cell migrates. As a result, oxygen-deficient areas form in the solid electrolyte. This phenomenon is also called blackening. The oxygen-deficient areas in the solid electrolyte are inferior in strength to the normal solid electrolyte. As a result, it is considered that cracking may occur in the internal structure of the sensor element 101, especially in the oxygen-deficient areas in the solid electrolyte.

As described above, the oxygen concentration is highest in the first internal cavity 20 nearest to the gas inlet 10 and reduces as the distance from the gas inlet 10 increases, that is, reduces in the order of the second internal cavity 40 and the third internal cavity 61. Therefore, the amount of oxygen that can be pumped out from the internal cavities 20, 40, and 61 by the pump cells 21, 50, and 41, respectively reduces in the order of the main pump cell 21, the auxiliary pump cell 50, and the measurement pump cell 41. The present inventor has found that migration of oxygen constituting the solid electrolyte can be suppressed by applying, in the startup pump control, the measurement pump startup voltage $Vp2_{INITIAL}$ that is higher than a voltage applied in the steady driving pump control and lower than the main pump startup voltage $Vp0_{INITIAL}$ to the measurement pump cell 41 in which the amount of oxygen that can be pumped out is small. As a result, blackening and the occurrence of cracking in the internal structure of the sensor element 101 can be suppressed.

In the startup pump control, the main pump startup voltage $Vp0_{INITIAL}$ applied to the main pump cell 21 that pumps out oxygen in the first internal cavity 20 nearest to the gas inlet 10 may be higher than the pump voltage Vp0 applied to the main pump cell 21 in the steady driving pump control ($Vp0_{INITIAL}$>Vp0 in the steady driving pump control). A specific value may appropriately be set depending on a desired light-off time or the intended use of the gas sensor 100.

The lower limit of the main pump startup voltage $Vp0_{INITIAL}$ is not particularly limited as long as it is higher than the pump voltage Vp0 applied in the steady driving pump control. This makes it possible to more quickly pump out oxygen in the first internal cavity 20 as compared to the steady driving pump control. As described above, the pump voltage Vp0 applied in the steady driving pump control is generally about 1 V at most. The lower limit of the main pump startup voltage $Vp0_{INITIAL}$ may be, for example, 1.1 V or more, 1.2 V or more, 1.5 V or more, or 1.8 V or more. The upper limit of the main pump startup voltage $Vp0_{INITIAL}$ is not particularly limited as long as migration of oxygen atoms of the solid electrolyte itself does not occur. For example, the upper limit of the main pump startup voltage $Vp0_{INITIAL}$ may be 3.0 V or less, 2.8 V or less, or 2.5 V or less. The main pump startup voltage $Vp0_{INITIAL}$ may be, for example, 1.5 V or more and 3.0 V or less.

In the startup pump control, the measurement pump startup voltage $Vp2_{INITIAL}$ applied to the measurement pump cell 41 that pumps out oxygen in the third internal cavity 61 having a low oxygen concentration may be higher than the pump voltage Vp2 applied to the measurement pump cell 41 in the steady driving pump control and lower than the main pump startup voltage $Vp0_{INITIAL}$ ($Vp0_{INITIAL}$>$Vp2_{INITIAL}$>Vp2 in the steady driving pump control). A specific value may appropriately be set depending on a desired light-off time or the intended use of the gas sensor 100.

The lower limit of the measurement pump startup voltage $Vp2_{INITIAL}$ is not particularly limited as long as it is higher than the pump voltage Vp2 applied in the steady driving pump control. This makes it possible to more quickly pump out oxygen in the third internal cavity 61 as compared to the steady driving pump control. As described above, the pump voltage Vp2 applied in the steady driving pump control is generally about 0.3 V at most. The lower limit of the measurement pump startup voltage $Vp2_{INITIAL}$ may be, for example, 0.4 V or more, 0.5 V or more, 0.6 V or more, or 0.7 V or more. The upper limit of the measurement pump startup voltage $Vp2_{INITIAL}$ is not particularly limited as long as migration of oxygen atoms of the solid electrolyte itself does not occur. For example, the upper limit of the measurement pump startup voltage $Vp2_{INITIAL}$ may be 1.5 V or less, 1.45 V or less, 1.3 V or less, or 1.2 V or less. However, the measurement pump startup voltage $Vp2_{INITIAL}$ is required to be lower than the main pump startup voltage $Vp0_{INITIAL}$. The measurement pump startup voltage $Vp2_{INITIAL}$ may be, for example, 0.5 V or more and 1.45 V or less.

In this embodiment, the auxiliary pump cell 50 is formed between the main pump cell 21 and the measurement pump cell 41. In the startup pump control, the auxiliary pump startup voltage $Vp1_{INITIAL}$ applied to the auxiliary pump cell 50 that pumps out oxygen in the second internal cavity 40 may be higher than a voltage applied to the auxiliary pump cell 50 in the steady driving pump control, equal to or lower than the main pump startup voltage $Vp0_{INITIAL}$, and higher than the measurement pump startup voltage $Vp2_{INITIAL}$. That is, the relationship among the main pump startup voltage $Vp0_{INITIAL}$, the auxiliary pump startup voltage $Vp1_{INITIAL}$ and the measurement pump startup voltage $Vp2_{INITIAL}$ may be $Vp0_{INITIAL}=Vp1_{INITIAL}>Vp2_{INITIAL}$, or $Vp0_{INITIAL}>Vp1_{INITIAL}>Vp2_{INITIAL}$. Alternatively, the relationship may be $Vp0_{INITIAL}>Vp1_{INITIAL}=Vp2_{INITIAL}$. A specific value may appropriately be set depending on a desired light-off time or the intended use of the gas sensor 100.

The lower limit of the auxiliary pump startup voltage $Vp1_{INITIAL}$ is not particularly limited as long as it is higher than the pump voltage Vp1 applied in the steady driving pump control. This makes it possible to more quickly pump out oxygen in the second internal cavity 40 as compared to the steady driving pump control. As described above, the pump voltage Vp1 applied in the steady driving pump control is generally about 0.8 V at most. The lower limit of the auxiliary pump startup voltage $Vp1_{INITIAL}$ may be, for example, 0.5 V or more, 0.6 V or more, 0.8 V or more, 0.9 V or more, or 1.0 V or more, on the condition that the auxiliary pump startup voltage $Vp1_{INITIAL}$ is higher than the pump voltage Vp1 applied in the steady driving pump control. However, the auxiliary pump startup voltage $Vp1_{INITIAL}$ is preferably equal to or higher than the measurement pump startup voltage $Vp2_{INITIAL}$. The upper limit of the auxiliary pump startup voltage $Vp1_{INITIAL}$ is not particularly limited as long as migration of oxygen atoms of the solid electrolyte itself does not occur. For example, the upper limit of the auxiliary pump startup voltage Vp1 INITIAL may be 3.0 V or less, 2.8 V or less, or 2.5 V or less, 2.0 V or less, or 1.5 V or less. However, the auxiliary pump startup voltage $Vp1_{INITIAL}$ is preferably equal to or lower than the main pump startup voltage $Vp0_{INITIAL}$. The auxiliary pump startup voltage $Vp1_{INITIAL}$ may be, for example, 0.6 V or more and 3.0 V or less.

When three or more pump cells are serially formed as described above, the startup voltage applied to the pump cell in the startup pump control may gradually be reduced as the distance of the pump cell from the gas inlet 10 increases.

The ratio ($Vp0_{INITIAL}/Vp2_{INITIAL}$) of a first startup voltage (the main pump startup voltage $Vp0_{INITIAL}$) applied to the main pump cell 21 nearest to the gas inlet 10 to a second startup voltage (the measurement pump startup voltage $Vp2_{INITIAL}$) applied to the measurement pump cell 41 farthest from the gas inlet 10 may appropriately be determined to be larger than 1. For example, the ratio may be 1.03 or more and 6.00 or less.

It is to be noted that the main pump startup voltage $Vp0_{INITIAL}$, the auxiliary pump startup voltage $Vp1_{INITIAL}$ and the measurement pump startup voltage $Vp2_{INITIAL}$ are stored as control values (set values) in the memory of the control part 91 which functions as the pump control part 93. On the basis of these control values, the CPU of the control part 91 which functions as the pump control part 93 performs the startup pump control of the gas sensor 100.

The concentration calculating part 94 is configured to calculate and output a NOx concentration in a measurement-object gas.

The concentration calculating part 94 acquires the pump current Ip2 in the measurement pump cell 41, calculates the NOx concentration in the measurement-object gas on the basis of a previously-stored conversion parameter (current-concentration conversion parameter) between the pump current Ip2 and the NOx concentration in the measurement-object gas, and outputs the NOx concentration as a measurement value of the gas sensor 100. The current-concentration conversion parameter is previously stored in the memory of the control part 91 which functions as the concentration calculating part 94. The current-concentration conversion parameter may appropriately be determined by those skilled in the art by, for example, previously performing an experiment on the gas sensor 100. The current-concentration conversion parameter may be, for example, the coefficient of an approximate expression (e.g., linear function) obtained by experiment or a map showing the relationship between the measurement pump current Ip2 and the NOx concentration in a measurement-object gas. The current-concentration conversion parameter may be specific to each individual gas sensor 100 or may be common to a plurality of gas sensors.

The determining part 95 is configured to determine a start and an end of the startup pump control.

For example, the determining part 95 makes the pump control part 93 start the startup pump control when determining that the temperature of the base part 102 (the sensor element 101) has reached a predetermined start determination threshold value (the starting temperature of the startup pump control) as a result of heating of the heater 72 performed by the heater control part 92. The determination whether the temperature of the base part 102 (the sensor element 101) has reached the starting temperature may be performed on the basis of the temperature of the base part 102 itself or the temperature of the heater 72.

The predetermined start determination threshold value (the starting temperature of the startup pump control) may appropriately be set to be equal to or less than the steady driving temperature. For example, the predetermined start determination threshold value may be equal to or more than a lower limit necessary to activate the solid electrolyte included in each of the pump cells 21, 50, and 41 (in this embodiment, the second solid electrolyte layer 6, the spacer layer 5, and the first solid electrolyte layer 4), that is, to develop the oxygen-ion-conductivity of the solid electrolyte. For example, when the determination is made on the basis of the temperature Th of the heater 72, the relationship between the temperature of the base part 102 (more specifically, the temperature of the solid electrolyte included in each of the pump cells 21, 50, and 41) and the temperature of the heater 72 may previously be determined by experiment or the like. The temperature Th of the heater 72 as the start determination threshold value may be, for example, 50% or more, 60% or more, 70% or more, 80% or more, or 90% or more of the set temperature $Th_{SET}$.

The determining part 95 may end the startup pump control and start the steady driving pump control when, for example, the oxygen concentration near the measurement electrode 44 becomes a target oxygen concentration.

For example, the determining part 95 may perform switching from the startup pump control to the steady driving pump control when determining that a pump current $1p2$ flowing through the measurement pump cell 41 in the startup pump control is equal to or less than a predetermined threshold value. The predetermined threshold value (the end determination threshold value) of the pump current Ip2 may appropriately be set depending on the intended use of the gas sensor 100. For example, the predetermined threshold value may be 0.1 μA to 5.0 μA.

Alternatively, the determining part 95 may perform switching from the startup pump control to the steady driving pump control when determining that an electromotive force V2 between the inner measurement electrode 44 and the reference electrode 42 in the startup pump control is equal to or more than a predetermined threshold value. The predetermined threshold value (the end determination threshold value) of the electromotive force V2 may appropriately be set depending on the intended use of the gas sensor 100. For example, the predetermined threshold value may be 0.3 V to 1.0 V.

[Startup Pump Control of Gas Sensor]

Next, the startup pump control from the activation of the gas sensor 100 to the steady driving pump control at the time when the concentration of a target gas to be measured in a measurement-object gas is measured using the gas sensor 100 will be described in detail.

A control method of the gas sensor of the present invention includes:

a startup pump control step performed at a startup of the sensor element, and a steady driving pump control step performed thereafter, wherein, in the startup pump control step, the pump control part 93 applies, between the inner pump electrode (the inner main pump electrode 22) and the outer pump electrode 23 of the adjustment pump cell (in this embodiment, the main pump cell 21), a startup voltage of the adjustment pump cell that is higher than a voltage applied to the adjustment pump cell in the steady driving pump control; and applies, between the inner measurement electrode (the measurement electrode 44) and the outer measurement electrode (in this embodiment, the outer pump electrode 23) of the measurement pump cell 41, a startup voltage of the measurement pump cell 41 that is higher than a voltage applied in the steady driving pump control and lower than the startup voltage of the adjustment pump cell, and in the steady driving pump control step, the pump control part adjusts an oxygen concentration in a measurement-object gas to a desired concentration by the adjustment pump cell, and detects a target gas to be measured in the measurement-object gas by the measurement pump cell 41.

The startup process of the gas sensor 100 of this embodiment will be described below in detail. FIG. 3 is a flow chart showing an example of the startup process of the gas sensor 100.

The gas sensor 100 is activated when, for example, receiving a start signal (Dew point). When the gas sensor 100 is installed in a car or the like, the start signal (Dew point) is, for example, a signal sent from an ECU, an exhaust gas treatment system, or the like of the car to the gas sensor

100. The gas sensor 100 may be activated by, for example, manually turning on the power supply of the control unit 90.

When the gas sensor 100 is activated, the heater control part 92 of the control part 91 starts a heater control that includes heating the heater 72 by the application of power to the heater 72 (step S10), and the sensor element 101 is heated to and maintained at a steady driving temperature (e.g., about 800° C.) at which the concentration of NOx is measured with high accuracy due to the activation of the solid electrolyte. In this embodiment, the base part 102 (the sensor element 101) is heated to the steady driving temperature by allowing the heater control part 92 to control the heater 72 so that the temperature Th of the heater 72 reaches a set temperature $Th_{SET}$.

After the heater control part 92 starts the heater control in the step S10, the determining part 95 performs start determination of a startup pump control (step S11). When the heater control part 92 starts the heater control, the heater 72 is heated so that the temperature of the base part 102 (the sensor element 101) is raised. The determining part 95 determines whether or not the temperature of the base part 102 has reached a starting temperature of the startup pump control. In this embodiment, the determining part 95 determines whether or not the temperature Th of the heater 72 corresponding to the temperature of the base part 102 is equal to or more than a start determination threshold value. A temperature that is 70% of the temperature of the heater 72 at the time of steady driving (the set temperature $Th_{SET}$) is used as the start determination threshold value by way of example.

The determining part 95 gives an instruction to start the startup pump control to the pump control part 93 when determining that the temperature Th of the heater 72 is equal to or more than the start determination threshold value. The pump control part 93 receives the instruction from the determining part 95 and starts the startup pump control (step S12). When determining that the temperature Th of the heater 72 is lower than the start determination threshold value, the determining part 95 repeatedly performs the step S11 until the temperature Th of the heater 72 becomes equal to or more than the start determination threshold value.

In the step S12, the pump control part 93 starts the startup pump control. Specifically, the pump control part 93 applies a main pump startup voltage $Vp0_{INITIAL}$ between the inner main pump electrode 22 and the outer pump electrode 23 in the main pump cell 21, applies an auxiliary pump startup voltage $Vp1_{INITIAL}$ between the auxiliary pump electrode 51 and the outer pump electrode 23 in the auxiliary pump cell 50, and applies a measurement pump startup voltage $Vp2_{INITIAL}$ between the measurement electrode 44 and the outer pump electrode 23 in the measurement pump cell 41. The main pump startup voltage $Vp0_{INITIAL}$, the auxiliary pump startup voltage Vp1 INITIAL, and the measurement pump startup voltage $Vp2_{INITIAL}$ are set to 2.0 V, 1.0 V, and 0.6 V, respectively. It is to be noted that even after the start of the startup pump control, the heater control part 92 continues to perform the heater control so that the temperature of the base part 102 is raised through the starting temperature of the startup pump control further up to the steady driving temperature. Further, the temperature of the base part 102 is maintained at the steady driving temperature.

Before the activation of the gas sensor 100, the inside of the measurement-object gas flow part 15 is considered to be filled with a gas atmosphere that is the same as a measurement-object gas. When the startup pump control is started, oxygen $O_2$ having existed in the first internal cavity 20 before the activation of the gas sensor 100 is pumped out by the main pump cell 21, oxygen $O_2$ having existed in the second internal cavity 40 before the activation of the gas sensor 100 is pumped out by the auxiliary pump cell 50, and oxygen $O_2$ having existed in the third internal cavity 61 before the activation of the gas sensor 100 and oxygen derived from NOx are pumped out by the measurement pump cell 41. Further, a measurement-object gas continuously enters through the gas inlet 10. Oxygen $O_2$ in the measurement-object gas continuously entering is pumped out mainly from the first internal cavity 20 nearest to the gas inlet 10 by the main pump cell 21. In this way, oxygen having existed in the measurement-object gas flow part 15 before the activation of the gas sensor 100 and oxygen continuously entering through the gas inlet 10 are efficiently pumped out from each of the internal cavities 20, 40, and 61.

Next, the determining part 95 performs end determination of the startup pump control (step S13). In this embodiment, the determining part 95 determines whether or not a pump current Ip2 flowing through the measurement pump cell 41 is equal to or less than a predetermined threshold value (an end determination threshold value). The end determination threshold value of the pump current Ip2 is set to 3.0 µA by way of example.

When determining that the pump current Ip2 is equal to or less than the end determination threshold value, the determining part 95 gives, to the pump control part 93, an instruction to switch from the startup pump control to a steady driving pump control. Further, the determining part 95 gives, to the concentration calculating part 94, an instruction to start to calculate and output the NOx concentration in the measurement-object gas on the basis of the pump current Ip2. When receiving the instruction from the determining part 95, the pump control part 93 ends the startup pump control and starts the steady driving pump control (step S14). When receiving the instruction from the determining part 95, the concentration calculating part 94 starts to calculate the NOx concentration. When determining that the pump current Ip2 is more than the end determination threshold value, the determining part 95 repeatedly performs the step S13 until the pump current Ip2 becomes equal to or less than the end determination threshold value.

In this embodiment, the temperature of the base part 102 (the sensor element 101) has no direct influence on the end determination of the startup pump control. However, it may be often the case that the pump current Ip2 becomes equal to or less than the end determination threshold value after the temperature of the base part 102 (the sensor element 101) becomes the steady driving temperature.

The light-off time is a time period from the time when the gas sensor 100 is activated (started) until the time when it becomes possible to measure the concentration of a target gas to be measured. Usually, it becomes possible to measure the concentration of a target gas to be measured at the time when the startup pump control ends and then the steady driving pump control starts. In this case, the light-off time is a required time from the activation of the gas sensor 100 to the end of the startup pump control. Depending on the intended use of the gas sensor 100, there may be a case where it becomes possible to measure the concentration of a target gas to be measured at the time when the pump current Ip2 becomes a predetermined value lower than the end determination threshold value of the startup pump control after the start of the steady driving pump control. In this case, the light-off time may be a time period from the activation of the gas sensor 100 to a predetermined time point after the start of the steady driving pump control.

Figure 4:
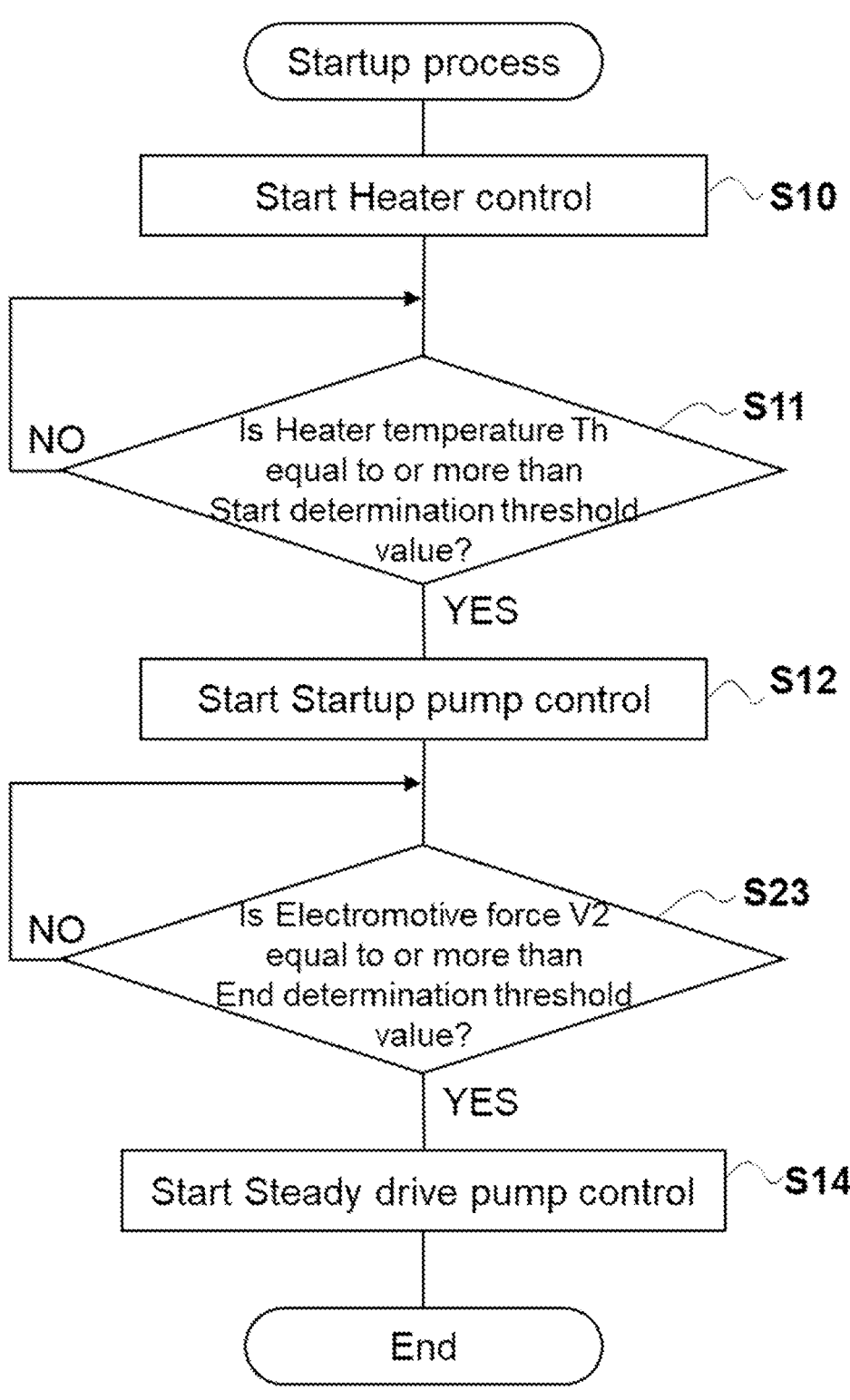
FIG. 4 is a flow chart showing a variation of the startup process of the gas sensor 100.

FIG. 4 is a flow chart showing a variation of the startup process of the gas sensor 100. In FIG. 4, the same step numbers as in FIG. 3 denote the same processes as in FIG. 3, and the description thereof will not be repeated. In the startup process shown in FIG. 4 as the variation, the end determination of the startup pump control performed by the determining part 95 is different from that shown in FIG. 3. In the startup process as the variation, the determining part 95 determines whether or not an electromotive force V2 between the measurement electrode 44 and the reference electrode 42 is equal to or more than a predetermined threshold value (an end determination threshold value) in the startup pump control (step S23). The end determination threshold value of the electromotive force V2 is set to 0.5 V by way of example.

When determining that the electromotive force V2 is equal to or more than the end determination threshold value, the determining part 95 gives, to the pump control part 93, an instruction to switch from the startup pump control to a steady driving pump control. When receiving the instruction from the determining part 95, the pump control part 93 ends the startup pump control and starts the steady driving pump control (step S14). When determining that the electromotive force V2 is less than the end determination threshold value, the determining part 95 repeatedly performs the step S23 until the electromotive force V2 becomes equal to or more than the end determination threshold value.

The gas sensor 100 for detecting the NOx concentration in a measurement-object gas has been described above as an example of the embodiment according to the present invention, but the present invention is not limited thereto. The present invention may include a gas sensor having any structure including a sensor element and a control unit as long as the object of the present invention can be achieved, that is, the light-off time can be shortened and the occurrence of cracking in the internal structure of the sensor element can be suppressed.

In the above embodiment, the gas sensor 100 detects the NOx concentration in a measurement-object gas. However, the target gas to be measured is not limited to NOx. For example, the target gas to be measured may be an oxide gas other than NOx (e.g., carbon dioxide $CO_2$, water $H_2O$). When the target gas to be measured is an oxide gas, as in the case of the above embodiment in which the NOx concentration is detected, a measurement-object gas containing an oxide gas itself is introduced into the third internal cavity 61, and the oxide gas in the measurement-object gas is reduced at the measurement electrode 44 so that oxygen is generated. The target gas to be measured can be detected by acquiring the generated oxygen as the measurement pump current Ip2 in the measurement pump cell 41.

Alternatively, the target gas to be measured may be a non-oxide gas such as ammonia $NH_3$. When the target gas to be measured is a non-oxide gas, the non-oxide gas is converted to an oxide gas (for example, in the case of ammonia $NH_3$, $NH_3$ is converted to NO), and a measurement-object gas containing the converted oxide gas is introduced into the third internal cavity 61. At the measurement electrode 44, the converted oxide gas in the measurement-object gas is reduced so that oxygen is generated. The target gas to be measured can be detected by acquiring the generated oxygen as the measurement pump current Ip2 in the measurement pump cell 41. The conversion from the non-oxide gas to the oxide gas can be performed by allowing at least one of the inner main pump electrode 22 and the auxiliary pump electrode 51 to function as a catalyst.

In the above embodiment, the determining part 95 performs the start determination of the startup pump control on the basis of the heater temperature Th. However, the start determination of the startup pump control is not limited thereto. The determination may be made on the basis of the detected temperature of the sensor element 101 (the base part 102) itself. Alternatively, the determination may be made on the basis of the fact that the resistance value of the solid electrolyte is reduced as the temperature of the sensor element 101 (the base part 102) is raised. For example, the startup pump control may be started when a resistance value detected in any one of the main pump cell 21 (the inner main pump electrode 22 and the outer pump electrode 23), the auxiliary pump cell 50 (the auxiliary pump electrode 51 and the outer pump electrode 23), and the measurement pump cell 41 (the measurement electrode 44 and the outer pump electrode 23) or a resistance value detected in any one of the oxygen-partial-pressure detection sensor cell 80 for main pump control (the inner main pump electrode 22 and the reference electrode 42), the oxygen-partial-pressure detection sensor cell 81 for auxiliary pump control (the auxiliary pump electrode 51 and the reference electrode 42), and the oxygen-partial-pressure detection sensor cell 82 for measurement pump control (the measurement electrode 44 and the reference electrode 42) is equal to or less than a predetermined threshold value.

In the above embodiment, the determining part 95 performs the end determination of the startup pump control on the basis of the pump current $Ip2$ or the electromotive force $V2$. However, the end determination of the startup pump control is not limited thereto. For example, switching from the startup pump control to the steady driving pump control may be performed at the time when the pump current $Ip0$ in the main pump cell 21 or the pump current $Ip1$ in the auxiliary pump cell 50 is determined to be equal to or less than a predetermined end determination threshold value. Alternatively, for example, switching from the startup pump control to the steady driving pump control may be performed at the time when the electromotive force $V0$ in the oxygen-partial-pressure detection sensor cell 80 for main pump control or the electromotive force $V1$ in the oxygen-partial-pressure detection sensor cell 81 for auxiliary pump control is determined to be equal to or more than a predetermined end determination threshold value. The end determination may be made on the basis of two or more end determination threshold values.

The determining part 95 may determine the start and/or the end of the startup pump control on the basis of the time elapsed from the activation of the gas sensor 100. For example, the startup pump control may be started at the same time with the activation of the gas sensor 100, or the startup pump control may be started after a lapse of a predetermined time from the activation of the gas sensor 100. The determining part 95 may determine the end of the startup pump control on the basis of the time elapsed from the start of the startup pump control.

In the above embodiment, predetermined startup voltages (the main pump startup voltage $Vp0_{INITIAL}$, the auxiliary pump startup voltage $Vp1_{INITIAL}$, and the measurement pump startup voltage $Vp2_{INITIAL}$) that are higher than voltages applied in the steady driving pump control are respectively applied to the main pump cell 21, the auxiliary pump cell 50, and the measurement pump cell 41 in the startup pump control. However, the present invention is not limited thereto. The application of startup voltages is not particularly limited as long as startup voltages that are higher than voltages applied in the steady driving pump control are resultantly applied in the startup pump control. For example, feedback control may be performed as in the case of the steady driving pump control. Specifically, for example, the pump control part 93 of the control part 91 may perform feedback control of the pump voltage $Vp1$ in the auxiliary pump cell 50 so that the electromotive force $V1$ in the oxygen-partial-pressure detection sensor cell 81 for auxiliary pump control becomes a startup set value $V1a_{SET}$. Further, a startup set value $V0a_{SET}$ of the electromotive force $V0$ in the oxygen-partial-pressure detection sensor cell 80 for main pump control may be set on the basis of the pump current $Ip1$ in the auxiliary pump cell 50 so that the pump current $Ip1$ becomes a startup set value $Ip1a_{SET}$, and feedback control of the pump voltage $Vp0$ in the main pump cell 21 may be performed so that the electromotive force $V0$ becomes the startup set value $V0a_{SET}$. Further, feedback control of the pump voltage $Vp2$ in the measurement pump cell 41 may be performed so that the electromotive force $V2$ in the oxygen-partial-pressure detection sensor cell 82 for measurement pump control becomes a startup set value $V2a_{SET}$. In this case, the startup set value $V1a_{SET}$, the startup set value $Ip1a_{SET}$, the startup set value $V0a_{SET}$, and the startup set value $V2a_{SET}$ are set to be higher than the set value $V1_{SET}$, the set value $Ip1_{SET}$, the set value $V0_{SET}$, and the set value $V2_{SET}$ in the steady driving pump control, respectively. This makes it possible to resultantly apply, in the startup pump control, startup voltages that are higher than voltages applied in the steady driving pump control.

In the above embodiment, in the steady driving pump control, the pump control part 93 of the control part 91 sets a set value $V0_{SET}$ of the electromotive force $V0$ in the oxygen-partial-pressure detection sensor cell 80 for main pump control on the basis of the pump current $Ip1$ in the auxiliary pump cell 50 so that the pump current $Ip1$ becomes a set value $Ip1_{SET}$, and performs feedback control of the pump voltage $Vp0$ of the variable power supply 24 in the main pump cell 21 so that the electromotive force $V0$ becomes the set value $V0_{SET}$. However, the control method is not limited thereto. For example, the pump control part 93 may perform feedback control of the pump voltage $Vp0$ of the variable power supply 24 in the main pump cell 21 so that the pump current $Ip1$ in the auxiliary pump cell 50 becomes a set value $Ip1_{SET}$. That is, the pump control part 93 may perform direct feedback control of the pump voltage $Vp0$ on the basis of the pump current $Ip1$ without acquiring the electromotive force $V0$ in the oxygen-partial-pressure detection sensor cell 80 for main pump control or setting the set value $V0_{SET}$.

In the gas sensor 100 of the above embodiment, as shown in FIG. 1, the sensor element 101 has a structure in which three internal cavities, the first internal cavity 20, the second internal cavity 40, and the third internal cavity 61 are provided and the inner main pump electrode 22, the auxiliary pump electrode 51, and the measurement electrode 44 are respectively disposed in these internal cavities. However, the structure of the sensor element 101 is not limited thereto. For example, the sensor element 101 may have a structure in which two internal cavities, the first internal cavity 20 and the second internal cavity 40 are provided, the inner main pump electrode 22 is disposed in the first internal cavity 20, and the auxiliary pump electrode 51 and the measurement electrode 44 are disposed in the second internal cavity 40. In this case, for example, a porous protective layer covering the measurement electrode 44 may be formed as a diffusion-rate limiting part between the auxiliary pump electrode 51 and the measurement electrode 44.

In the gas sensor 100 of the above embodiment, the outer pump electrode 23 has three functions as an outer main pump electrode in the main pump cell 21, an outer auxiliary pump electrode in the auxiliary pump cell 50, and an outer measurement electrode in the measurement pump cell 41. However, the outer pump electrode 23 is not limited thereto. For example, the outer main pump electrode, the outer auxiliary pump electrode, and the outer measurement electrode may be formed as different electrodes. For example, any one or more of the outer main pump electrode, the outer auxiliary pump electrode, and the outer measurement electrode may be provided on the outer surface of the base part 102 separately from the outer pump electrode 23 so as to be in contact with a measurement-object gas. Alternatively, the reference electrode 42 may also serve as any one or more of the outer main pump electrode, the outer auxiliary pump electrode, and the outer measurement electrode.

As described above, according to the present invention, it is possible to shorten a light-off time and to suppress the occurrence of cracking in the internal structure of a sensor element by suppressing blackening of the sensor element.

EXPLANATION OF REFERENCE SIGNS IN THE DRAWINGS

1: first substrate layer; 2: second substrate layer; 3: third substrate layer; 4: first solid electrolyte layer; 5: spacer layer; 6: second solid electrolyte layer; 10: gas inlet; 11: first diffusion-rate limiting part; 12: buffer space; 13: second diffusion-rate limiting part; 15: measurement-object gas flow part; 20: first internal cavity; 21: main pump cell; 22: inner main pump electrode; 22*a*: ceiling electrode portion (of the inner main pump electrode); 22*b*: bottom electrode portion (of the inner main pump electrode); 23: outer pump electrode; 24: variable power supply (of the main pump cell); 30: third diffusion-rate limiting part; 40: second internal cavity; 41: measurement pump cell; 42: reference electrode; 43: reference gas introduction space; 44: measurement electrode; 46: variable power supply (of the measurement pump cell); 48: air introduction layer; 50: auxiliary pump cell; 51: auxiliary pump electrode; 51*a*: ceiling electrode portion (of the auxiliary pump electrode); 51*b*: bottom electrode portion (of the auxiliary pump electrode); 52: variable power supply (of the auxiliary pump cell); 60: fourth diffusion-rate limiting part; 61: third internal cavity; 70: heater part; 71: heater electrode; 72: heater; 73: through hole; 74: heater insulating layer; 75: pressure relief vent; 76: heater lead; 77: heater power supply; 80: oxygen-partial-pressure detection sensor cell for main pump control; 81: oxygen-partial-pressure detection sensor cell for auxiliary pump control; 82: oxygen-partial-pressure detection sensor cell for measurement pump control; 83: sensor cell; 90: control unit; 91: control part; 92: heater control part; 93: pump control part; 94: concentration calculating part; 95: determining part; 100: gas sensor; 101: sensor element; and 102: base part.

What is claimed is:

1. A gas sensor for detecting a target gas to be measured in a measurement-object gas, the gas sensor comprising a sensor element and a control unit for controlling the sensor element, wherein the sensor element comprises:

a base part in an elongated plate shape, including an oxygen-ion-conductive solid electrolyte layer;

a measurement-object gas flow part formed from one end part in a longitudinal direction of the base part;

an adjustment pump cell for adjusting an oxygen concentration in a measurement-object gas to a desired concentration, the adjustment pump cell including: an inner pump electrode disposed on an inner surface of the measurement-object gas flow part; and an outer pump electrode disposed at a position different from the measurement-object gas flow part on the base part and corresponding to the inner pump electrode; and a measurement pump cell for detecting a target gas to be measured in the measurement-object gas, the measurement pump cell including: an inner measurement electrode disposed at a position farther from the one end part in the longitudinal direction of the base part than the inner pump electrode on the inner surface of the measurement-object gas flow part; and an outer measurement electrode disposed at a position different from the measurement-object gas flow part on the base part and corresponding to the inner measurement electrode, and the control unit comprises:

a pump control part for controlling operation of the adjustment pump cell and the measurement pump cell, wherein the pump control part is configured to perform a startup pump control at a startup of the sensor element, and a steady driving pump control at a steady drive of the sensor element after the startup, in the startup pump control, the pump control part is configured to apply, between the inner pump electrode and the outer pump electrode of the adjustment pump cell, a startup voltage of the adjustment pump cell that is higher than a voltage applied to the adjustment pump cell in the steady driving pump control; and to apply, between the inner measurement electrode and the outer measurement electrode of the measurement pump cell, a startup voltage of the measurement pump cell that is higher than a voltage applied to the measurement pump cell in the steady driving pump control and lower than the startup voltage of the adjustment pump cell, in the steady driving pump control, the pump control part is configured to adjust an oxygen concentration in a measurement-object gas to a desired concentration by the adjustment pump cell; and to detect a target gas to be measured in the measurement-object gas by the measurement pump cell, and a voltage ratio of the startup voltage of the adjustment pump cell to the startup voltage of the measurement pump cell is 1.03 or more and 6.00 or less.

2. The gas sensor according to claim 1, wherein the sensor element further comprises:

an auxiliary pump cell for further adjusting the oxygen concentration in the measurement-object gas, the auxiliary pump cell including: an inner auxiliary pump electrode disposed at a position farther from the one end part in the longitudinal direction of the base part than the inner pump electrode on the inner surface of the measurement-object gas flow part; and an outer auxiliary pump electrode disposed at a position different from the measurement-object gas flow part on the base part and corresponding to the inner auxiliary pump electrode, wherein in the startup pump control, the pump control part is further configured to apply, between the inner auxiliary pump electrode and the outer auxiliary pump electrode of the auxiliary pump cell, a startup voltage of the auxiliary pump cell that is higher than a voltage applied to the auxiliary pump cell in the steady driving pump control, equal to or lower than the startup voltage of the adjustment pump cell, and higher than the startup voltage of the measurement pump cell, and in the steady driving pump control, the pump control part is further configured to adjust the oxygen concentration in the measurement-object gas to the desired concentration by the adjustment pump cell; further adjusts, by auxiliary pump cell, the oxygen concentration in the measurement-object gas that has been adjusted by the adjustment pump cell; and to detect the target gas to be measured in the measurement-object gas by the measurement pump cell.

3. The gas sensor according to claim 1, wherein the sensor element comprises a heater for heating the base part, and the control unit comprises:
a heater control part for controlling the heater; and
a determining part for determining a start and an end of the startup pump control, wherein the heater control part is configured to perform a heater control that includes heating the base part by the heater to raise a temperature of the base part through a starting temperature of the startup pump control further up to a predetermined steady driving temperature, and maintaining the temperature of the base part at the steady driving temperature; and the determining part is configured to make the pump control part start the startup pump control, when the determining part determines that the temperature of the base part reaches the starting temperature of the startup pump control.

4. The gas sensor according to claim 3, wherein the determining part is configured to make the pump control part switch from the startup pump control to the steady driving pump control, when the determining part determines that a pump current flowing through the measurement pump cell is equal to or less than a predetermined threshold value in the startup pump control.

5. The gas sensor according to claim 3, wherein the sensor element comprises a reference electrode disposed inside the base part to be in contact with a reference gas, and the determining part is configured to make the pump control part switch from the startup pump control to the steady driving pump control, when the determining part determines that an electromotive force between the inner measurement electrode and the reference electrode is equal to or more than a predetermined threshold value in the startup pump control.

6. The gas sensor according to claim 1, wherein the startup voltage of the adjustment pump cell is 1.5 V or more and 3.0 V or less.

7. The gas sensor according to claim 1, wherein the startup voltage of the measurement pump cell is 0.5 V or more and 1.45 V or less.

8. A control method of a gas sensor for detecting a target gas to be measured in a measurement-object gas, the gas sensor comprising a sensor element and a control unit for controlling the sensor element, wherein
the sensor element comprises:
a base part in an elongated plate shape, including an oxygen-ion-conductive solid electrolyte layer;
a measurement-object gas flow part formed from one end part in a longitudinal direction of the base part;
an adjustment pump cell for adjusting an oxygen concentration in a measurement-object gas to a desired concentration, the adjustment pump cell including: an inner pump electrode disposed on an inner surface of the measurement-object gas flow part; and an outer pump electrode disposed at a position different from the measurement-object gas flow part on the base part and corresponding to the inner pump electrode; and
a measurement pump cell for detecting a target gas to be measured in the measurement-object gas, the measurement pump cell including: an inner measurement electrode disposed at a position farther from the one end part in the longitudinal direction of the base part than the inner pump electrode on the inner surface of the measurement-object gas flow part; and an outer measurement electrode disposed at a position different from the measurement-object gas flow part on the base part and corresponding to the inner measurement electrode, and
the control unit comprises:
a pump control part for controlling operation of the adjustment pump cell and the measurement pump cell, and
the control method comprising:
a startup pump control step performed at a startup of the sensor element, and a steady driving pump control step performed thereafter, wherein
in the startup pump control step, the pump control part applies, between the inner pump electrode and the outer pump electrode of the adjustment pump cell, a startup voltage of the adjustment pump cell that is higher than a voltage applied to the adjustment pump cell in the steady driving pump control; and applies, between the inner measurement electrode and the outer measurement electrode of the measurement pump cell, a startup voltage of the measurement pump cell that is higher than a voltage applied to the measurement pump cell in the steady driving pump control and lower than the startup voltage of the adjustment pump cell,
in the steady driving pump control step, the pump control part adjusts an oxygen concentration in a measurement-object gas to a desired concentration by the adjustment pump cell, and detects a target gas to be measured in the measurement-object gas by the measurement pump cell, and
a voltage ratio of the startup voltage of the adjustment pump cell to the startup voltage of the measurement pump cell is 1.03 or more and 6.00 or less.

* * * * *